(12) United States Patent
Yamagishi

(10) Patent No.: US 11,863,369 B2
(45) Date of Patent: Jan. 2, 2024

(54) NETWORK CONTROL METHOD AND DATA PROCESSING SYSTEM

(71) Applicant: Sony Group Corporation, Tokyo (JP)

(72) Inventor: Yasuaki Yamagishi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/999,867

(22) PCT Filed: Dec. 7, 2020

(86) PCT No.: PCT/JP2020/045486
§ 371 (c)(1),
(2) Date: Nov. 25, 2022

(87) PCT Pub. No.: WO2021/260969
PCT Pub. Date: Dec. 30, 2021

(65) Prior Publication Data
US 2023/0216725 A1    Jul. 6, 2023

Related U.S. Application Data

(60) Provisional application No. 63/044,556, filed on Jun. 26, 2020.

(51) Int. Cl.
*H04L 41/0604* (2022.01)
(52) U.S. Cl.
CPC ................ *H04L 41/0604* (2013.01)
(58) Field of Classification Search
CPC .................................................. H04L 41/0604
See application file for complete search history.

(56) References Cited

U.S. PATENT DOCUMENTS 7,200,110 B1 *  4/2007  Burns ................. H04L 43/0811
                                                 370/536
8,779,921 B1 *  7/2014  Curtiss ................ G08B 25/009
                                                 340/541
(Continued)

FOREIGN PATENT DOCUMENTS

JP    2004-302959 A    10/2004
JP    2009-017031 A     1/2009
(Continued)

OTHER PUBLICATIONS

International Search Report and Written Opinion dated Feb. 22, 2021, received for PCT Application PCT/JP2020/045486, filed on Dec. 7, 2020, 9 pages including English Translation.

*Primary Examiner* — Philip C Lee
(74) *Attorney, Agent, or Firm* — XSENSUS LLP

(57) ABSTRACT

The present disclosure relates to a network control method and a data processing system that enable to efficiently perform transfer processing on a large amount of data.

A network connection device sends, to a data processing device prior to original data, event data indicating a change amount at a predetermined time point of sensor data that is the original data generated by a sensor device, and sends the original data to the data processing device on the basis of a request from the data processing device for the original data. The present technology can be applied to, for example, a network control method of cloud computing.

18 Claims, 30 Drawing Sheets

(56) References Cited

U.S. PATENT DOCUMENTS

| | | | | |
|---|---|---|---|---|
| 2014/0364089 A1* | 12/2014 | Lienhart | ................. | H04W 4/12 |
| | | | | 455/412.2 |
| 2017/0064412 A1* | 3/2017 | Taxier | .................... | H04L 67/12 |
| 2018/0201494 A1* | 7/2018 | Chhabra | ................. | G01C 19/02 |
| 2020/0076743 A1* | 3/2020 | Jin | ......................... | H04L 67/54 |
| 2021/0315031 A1* | 10/2021 | Wu | .................... | A61N 1/37252 |
| 2022/0166958 A1* | 5/2022 | Hoshino | .................. | H04N 5/33 |

FOREIGN PATENT DOCUMENTS

| | | |
|---|---|---|
| JP | 2013-101559 A | 5/2013 |
| WO | 2020/195769 A1 | 10/2020 |

\* cited by examiner

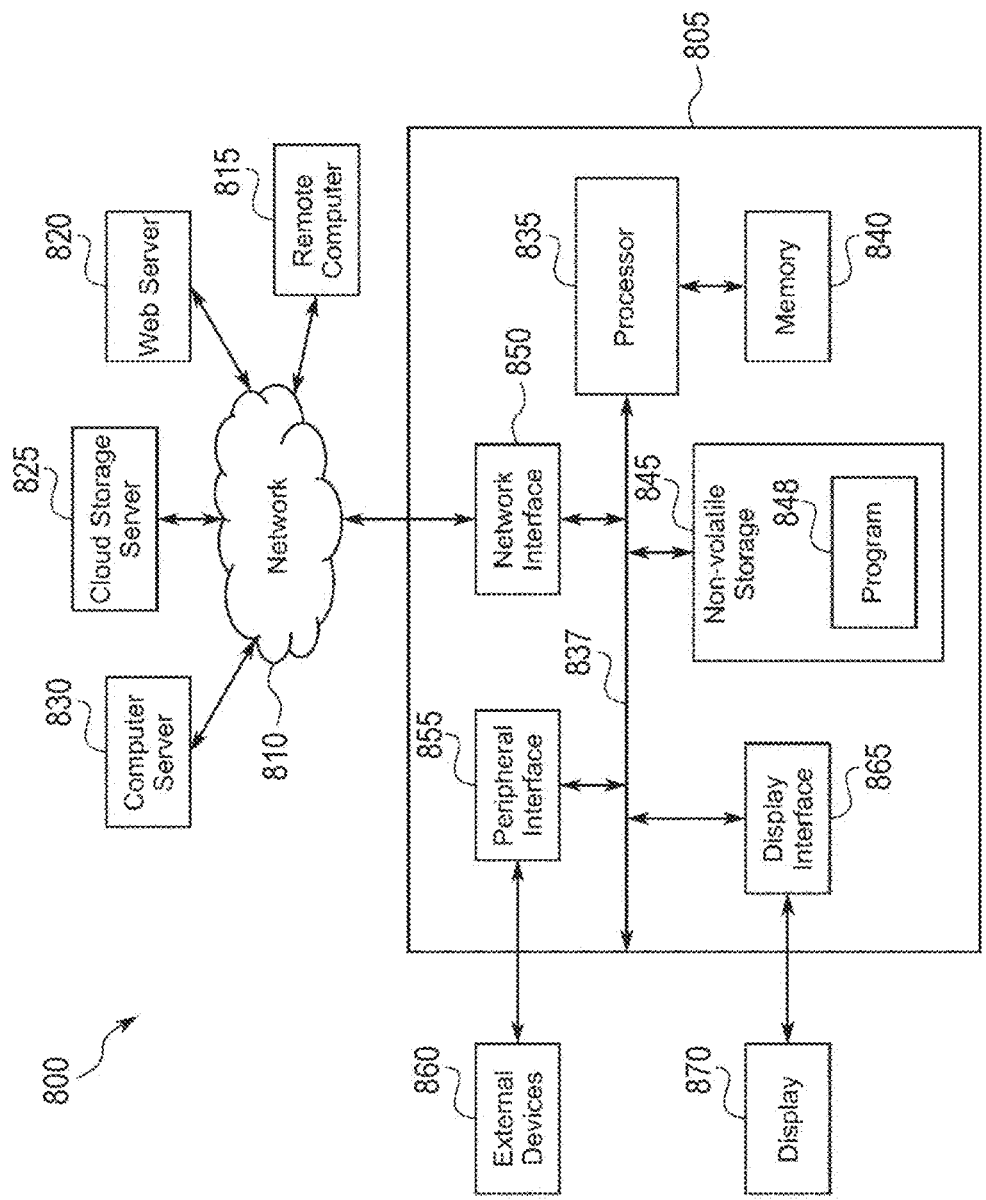

NETWORK CONTROL METHOD AND DATA PROCESSING SYSTEM

CROSS-REFERENCE TO RELATED APPLICATIONS

The present application is based on PCT filing PCT/JP2020/045486, filed Dec. 7, 2020, which claims priority to U.S. Provisional Application No. 63/044,556 filed Jun. 26, 2020, the entire contents of each are incorporated herein by reference.

TECHNICAL FIELD

The present disclosure relates to a network control method and a data processing system, and particularly relates to a network control method and a data processing system capable of efficiently performing transfer processing on a large amount of data.

BACKGROUND ART

The present applicant has previously proposed an object detecting system using a combination of a synchronous image sensor and an asynchronous DVS, in Patent Document 1. The synchronous image sensor is a sensor that captures an image in synchronization with a vertical synchronization signal, and outputs frame data that is image data of one frame (screen) at a period of the vertical synchronization signal. The DVS is an abbreviation of a dynamic vision sensor, and is a sensor that outputs event data indicating an occurrence of an event in a case where the event occurs, with a luminance change in a pixel as the event. Since the DVS outputs the event data at a timing when the event occurs regardless of a vertical synchronization signal, the DVS can be referred to as an asynchronous (or address control) image sensor.

Since the event data generated by the DVS needs to be used without a delay, time granularity is extremely fine in the data. If a large amount of data generated from the DVS is indiscriminately injected into a network, the network may fail in a case where a capacity of the network is limited, and data that is really necessary may not be processed correctly. On the contrary, in a case where excessive calculation resources are always reserved in preparation for a large amount of data, an excessive cost is incurred.

CITATION LIST

Patent Document

Patent Document 1: International Publication No. 2020/195769

SUMMARY OF THE INVENTION

Problems to be Solved by the Invention

Therefore, in order to reliably process data having high urgency or priority, a new technique for control of data transfer to a network is required.

The present disclosure has been made in view of such a situation, and is intended to enable efficient transfer processing of a large amount of data.

Solutions to Problems

A network control method according to a first aspect of the present disclosure includes sending, by a network connection device to a data processing device prior to original data, event data indicating a change amount at a predetermined time point of sensor data that is the original data generated by a sensor device, and sending the original data to the data processing device on the basis of a request from the data processing device for the original data.

A data processing system according to a second aspect of the present disclosure includes a network connection device configured to send, to a data processing device prior to original data, event data indicating a change amount at a predetermined time point of sensor data that is the original data generated by a sensor device, and send the original data to the data processing device on the basis of a request from the data processing device for the original data.

In the first and second aspects of the present disclosure, event data is sent to the data processing device prior to original data, in which the event data indicates a change amount at a predetermined time point of sensor data that is the original data generated by the sensor device, and the original data is sent to the data processing device on the basis of a request from the data processing device for the original data.

Note that the network control method according to the first aspect and the data processing system according to the second aspect of the present disclosure can be implemented by causing a computer to execute a program. The program to be executed by the computer can be provided by being transmitted via a transmission medium or by being recorded on a recording medium.

The data processing system may be an independent device, or may be an internal block that forms one device.

BRIEF DESCRIPTION OF DRAWINGS

FIG. 34 is a block diagram illustrating a configuration example of cloud computing.

MODE FOR CARRYING OUT THE INVENTION

Figure 1:
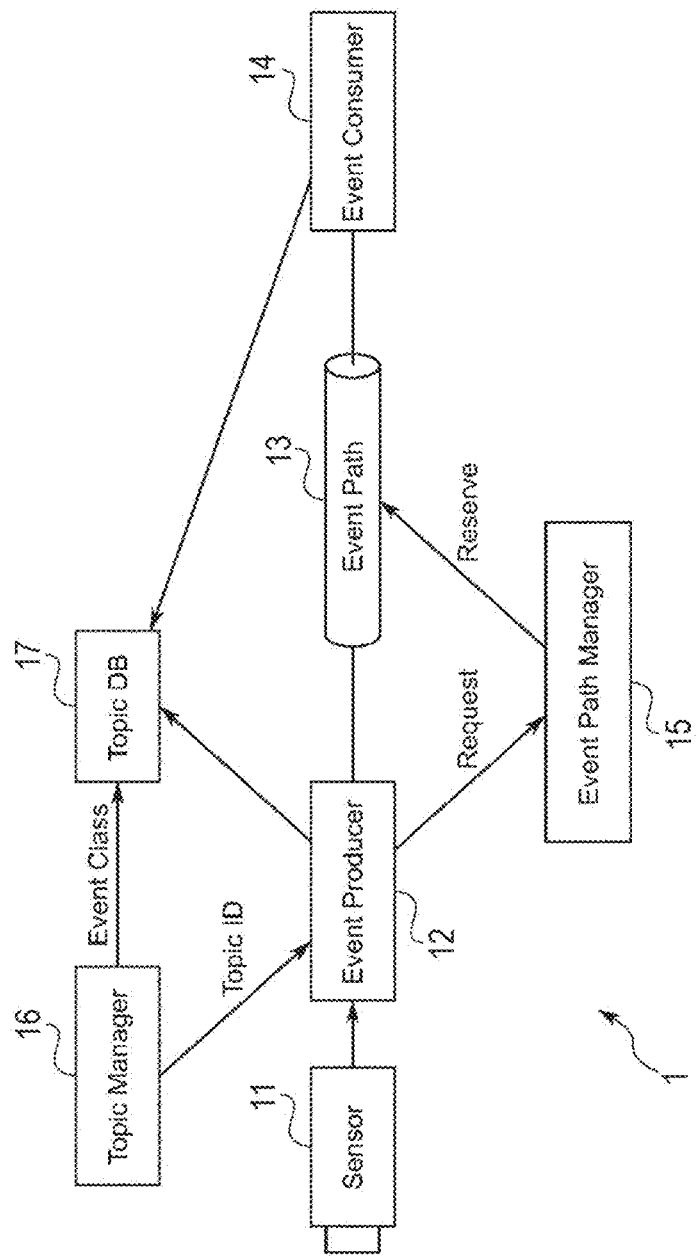
FIG. 1 is a block diagram illustrating a configuration example of a first embodiment of a data processing system to which the present disclosure is applied.

Hereinafter, embodiments for implementing the present disclosure (hereinafter, referred to as embodiments) will be described with reference to the accompanying drawings. Note that, in this specification, the description of "and/or" means that both "and" and "or" can be taken. Furthermore, in this specification and the drawings, components having substantially the same functional configuration are denoted by the same reference numerals, and redundant explanations are omitted. The description will be given in the following order.

1. First embodiment of data processing system
2. Description of event data
3. Sending control of event data and original data
4. Accumulation processing of event data
5. Identification of data based on topic ID
6. Sending control in case where event type is Notify
7. Accumulation processing of event data
8. Reservation and assignment of event path
9. Negotiation of event class
10. Second embodiment of data processing system
11. Sending control of event data and original data
12. Negotiation of event class
13. Immediate transfer and delayed transfer
14. Configuration example of cloud computing <1. First Embodiment of Data Processing System>

FIG. 1 is a block diagram illustrating a configuration example of a first embodiment of a data processing system to which the present disclosure is applied.

A data processing system 1 of FIG. 1 includes a sensor 11 and an event producer 12.

The sensor 11 is a sensor device that detects a state of some kind, and supplies sensor data that is a detection result to the event producer 12. Examples of the sensor 11 include an acceleration sensor, a gyro sensor, a magnetic sensor, an odor sensor, an atmospheric pressure sensor, a temperature sensor, a humidity sensor, a wind speed sensor, an optical sensor (an RGB sensor, an IR sensor, and the like), a GPS sensor, and the like, for example, as used as an Internet of Things (IoT) sensor.

The event producer 12 is an application that transfers data acquired by the sensor 11 to a network. The event producer 12 uses data supplied from the sensor 11 as source data (hereinafter, also referred to as original data or simply an original), to generate, as event data, a change amount of the original after a certain time point. Generally, the event data has a very small data amount with respect to the original data.

For example, in a case where the sensor 11 is an image sensor (an RGB sensor) that receives RGB light, the original data can be a captured image obtained by imaging, and the event data can be luminance data indicating a change amount in luminance value from a previously obtained captured image. Furthermore, for example, in a case where the sensor 11 is a sensor device that detects a state of a product DB that stores prices of a plurality of products, the price of the product itself is the original data, and a change amount in the price is the event data.

The data processing system 1 also includes an event consumer 14 and an event path manager 15.

The event producer 12 sends the original data and the event data to the event consumer 14 via an event path 13. The event path 13 is a virtual path (a communication path) in a network, and the virtual path is assigned by the event path manager 15 and is for providing the original data and the event data to the event consumer 14.

The event consumer 14 is an application that utilizes data acquired by the sensor 11. The event consumer 14 performs predetermined data processing, for example, data analysis processing, recognition processing, or the like, by using the original data and the event data sent from the event producer 12 via the event path 13. By referring to a topic DB 17, the event consumer 14 can select event data and original data necessary for the self from among data to be transferred on the network.

The event path manager 15 reserves a virtual path connecting the event producer 12 and the event consumer 14 from paths in the network in response to a request from the event producer 12, and assigns the virtual path as the event path 13.

The data processing system 1 further includes a topic manager 16 and the topic database (DB) 17.

The topic manager 16 assigns a topic ID, and notifies the event producer 12. A topic represents observation target data to be notified as the event data by the event producer 12, and the topic ID is identification information for identifying the topic. Furthermore, the topic manager 16 assigns an event class to every topic ID assigned by the self, and stores the event class in the topic DB 17. The event class indicates priority of the virtual path when the event path manager 15 assigns the event path 13. The event class is represented by, for example, a class ID which is identification information for identifying the class. For example, the priority is determined in advance for every class ID such that the class ID of No. 25 is a class having high priority and the class ID of No. 35 is a class having low priority, and the event class is designated by the class ID.

Before transferring the event data, the event producer 12 stores, in the topic DB 17 in advance, a set of the topic ID notified from the topic manager 16 and topic description information (Topic Description) describing the topic. Furthermore, the event producer 12 requests the event path manager 15 to assign the event path 13 with an event class designated.

The topic DB 17 stores, for every topic, a set of the topic ID and the topic description information registered by the event producer 12. Furthermore, the event class of each topic ID registered by the topic manager 16 is also stored in the topic DB 17 in association with the topic ID. The topic DB 17 is referred to by the event consumer 14 for the event consumer 14 to select necessary event data.

The event path 13 connecting the event producer 12 and the event consumer 14 of FIG. 1 is one P2P (peer to peer) connection that transmits the original data, which is based on sensor data acquired by the sensor 11, and the event data. Although not illustrated, the data processing system 1 includes a plurality of sensors 11. Further, for each of the plurality of sensors 11, the event producer 12 that transfers the sensor data into the network and the event consumer 14 that uses the sensor data are connected by P2P. The event path manager 15 assigns the event path 13 for each P2P connection. The topic manager 16 manages the topic IDs for all the topics to be transferred in the network. The topic DB 17 stores information regarding all the topics to be transferred in the network.

As described above, various sensor devices can be taken as the sensor 11 of the data processing system 1 in FIG. 1. Hereinafter, a case will be described as an example in which the sensor 11 is an extended DVS including a synchronous image sensor (FIS) and an asynchronous DVS. The synchronous image sensor is a sensor that captures an image in synchronization with a vertical synchronization signal, and outputs frame data that is image data of one frame (screen) at a period of the vertical synchronization signal. The DVS is a sensor that outputs event data indicating an occurrence of an event asynchronously in accordance with a timing of the occurrence of the event, with a luminance change in a pixel as the event.

The DVS will be briefly described.

The DVS is a sensor including a pixel that photoelectrically converts an optical signal and outputs a pixel signal, and configured to output a temporal luminance change of the optical signal as an event signal (event data) on the basis of the pixel signal. Such an event sensor is also referred to as an event-based vision sensor (EVS). While the synchronous image sensor captures an image in synchronization with a vertical synchronization signal, and outputs frame data that is image data of one frame (screen) at a period of the vertical synchronization signal, the DVS outputs the event data only at a timing when an event occurs. Therefore, it can be said that the DVS is an asynchronous (or address control) camera. In the following description, a synchronous image sensor that outputs frame-based image data at a predetermined period (frame rate) is referred to as an FIS in order to be distinguished from the DVS.

In the DVS, for example, a voltage signal corresponding to a logarithmic value of an amount of received light incident on each pixel is detected as a pixel signal. Then, the DVS outputs "+1" representing a luminance change in a positive direction in a case where a change value of logarithmic luminance represented by the pixel signal is changed to be brighter exceeding a predetermined threshold value c, and outputs "−1" representing a luminance change in a negative direction in a case where the change value is changed to be darker exceeding the predetermined threshold value c.

The event data is represented, for example, in the following form called an address-event representation (AER) format.

$$e=(x,y,p,t) \quad (1)$$

In Equation (1), "x, y" represents coordinates of a pixel in which a luminance change has occurred.

A time t of the event is a time stamp indicating a time when the event occurs, and is represented by, for example, a count value of a counter based on a predetermined clock signal in the sensor. It can be said that the time stamp corresponding to the timing at which the event has occurred is time information indicating the (relative) time at which the event has occurred, as long as an interval between events is maintained as it is at the time of occurrence of the event.

A polarity p represents a direction of a luminance change in a case where a luminance change (a light amount change) exceeding the predetermined threshold value c occurs as an event, and indicates whether the luminance change is a change in a positive direction (hereinafter, also referred to as positive) or a change in a negative direction (hereinafter, also referred to as negative).

The polarity p of the event is, for example, represented as "+1" in a case of positive, and represented as "−1" in a case of negative.

Here, it is assumed that there is a time-series sequence $e^n = \{x, y, p^n, t^n\}$ (n=1, 2, 3, . . . , $N_{(x, y)}$) of N pieces of event detected by the DVS in the pixel (x, y) on a two-dimensional coordinate space. Assuming that L is a luminance image and there is no noise, an initial luminance value, that is, a luminance value of the pixel (x, y) in an initial state in which no event has occurred is $L^0(x, y)$. Furthermore, since the threshold value of logarithmic luminance for an occurrence of a positive or negative event is c, the logarithmic luminance increases by c when p is positive, and the logarithmic luminance decreases by c when p is negative.

In this case, using a luminance image $L^{n-1}(x, y)$ at a time $t^{n-1}$ and an event $e^n$ at a time $t^n$, a luminance image $L^n(x, y)$ at the time $t^n$ can be obtained by the following Equation (2).

$$L^n(x,y)=L^{n-1}(x,y)*\exp(c)(\text{when } p^n>0)$$

$$L^n(x,y)=L^{n-1}(x,y)*\exp(-c)(\text{when } p^n<0) \quad (2)$$

However, in practice, as the logarithmic luminance change c decreases, a probability that the DVS will pick up noise increases, and thus some noise correction is required.

As described above, the DVS outputs only the position coordinates of the pixel in which the luminance change is detected, the polarity, and the time information. Since only a net change (difference) of the position coordinates, the polarity, and the time information is generated and outputted, further, there is no redundancy in an information amount of the data, and the DVS sensor has high temporal resolution on the order of psec. Since the information amount is small, power consumption is lower than that of a frame-based image sensor, and there is no unnecessary processing load even in a case of processing data, and processing time can be shortened. Since high-speed and low-delay data output is possible, an accurate time at which the event has occurred can be obtained.

Note that the sensor 11 that is the extended DVS including the FIS that outputs frame data and the DVS that outputs the event data may have a mode in which the FIS and the DVS are provided in one device and adjusted so as to have the same imaging range, or a configuration may be adopted in which the FIS and the DVS are provided as different devices to be arranged adjacent to each other and adjusted so as to have the same imaging range. Furthermore, one sensor may be used in which each pixel can output both the event data of the DVS and the image frame data of the FIS. Examples of the sensor in which each pixel can output both the event data of the DVS and the image frame data of the FIS includes, for example, a dynamic and active-pixel vision sensor (DAVIS) sensor disclosed in "Brandli et al. A 240× 180 130 dB 3 us latency global shutter spatiotemporal vision sensor, IEEEJSSC, 2014".

The sensor 11 notifies the event producer 12 of event $e^n = \{x, y, p^n, t^n\}$ corresponding to a luminance change amount between the luminance image $L^{n-1}(x, y)$ at the time $t^{n-1}$ as the original data and the luminance image $L^n(x, y)$ at the time $t^n$.

<2. Description of Event Data>

Next, event data to be transferred into the network by the event producer 12 will be described with reference to FIG. 2.

Figure 2:
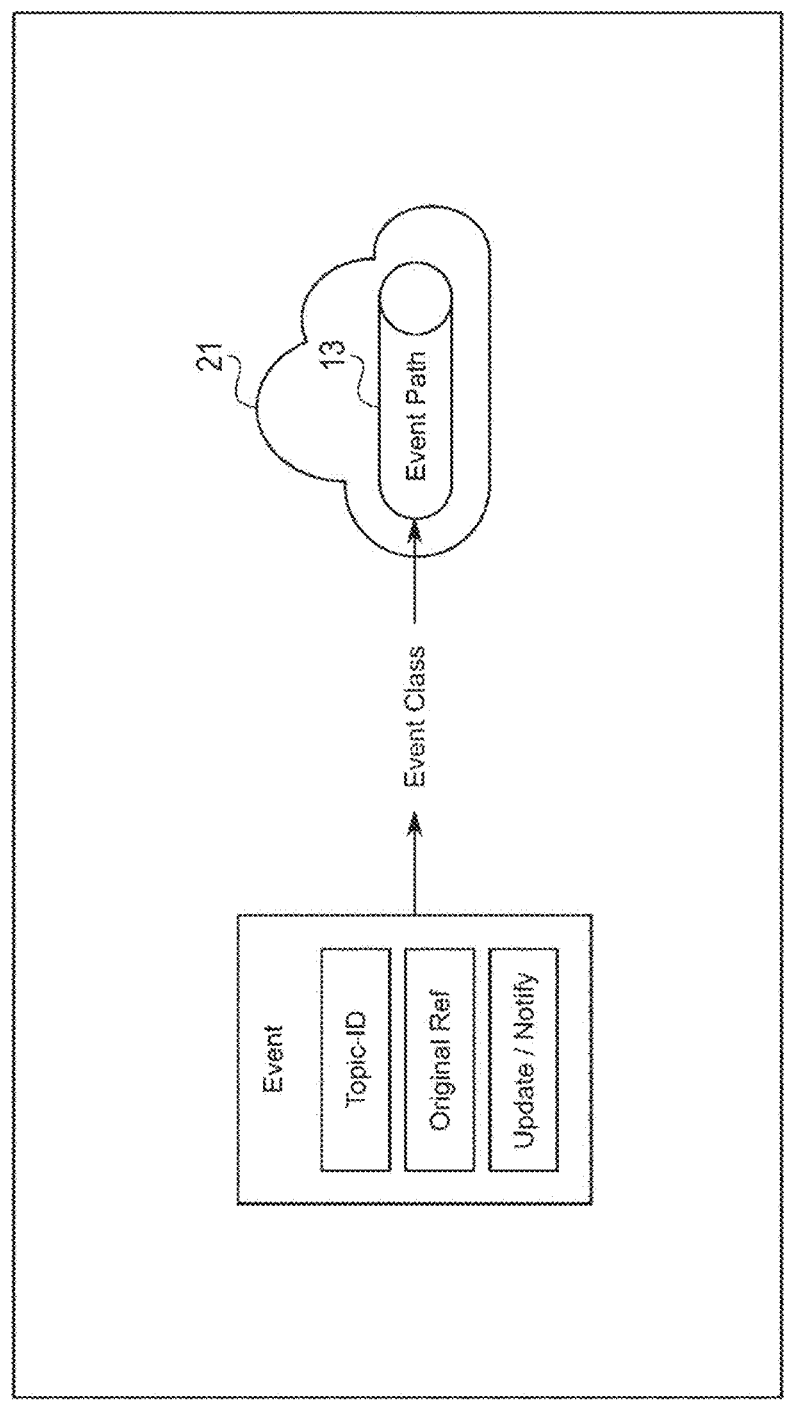
FIG. 2 is a diagram for explaining event data generated by an event producer and transferred into a network.

As illustrated in FIG. 2, the event data is transferred to the event path 13 reserved in a cloud 21 (network), including at least a topic ID, an original reference, and an event type. The event path 13 is assigned by the topic manager 16 in accordance with the topic ID, and is a path according to the event class.

The topic ID (Topic ID) is observation data identification information for identifying observation target data to be notified as the event data.

The event type indicates a type of the event data, and the event type stores either Update including data of a change amount or Notify that does not include data of a change amount but notifies only of a fact that there has been a change.

In a case where the event type is Update, the original reference (Original Ref) stores a reference address that refers to original data before a luminance change expressed in Update is applied. Whereas, in a case where the event type is Notify, the original reference stores a reference address that refers to updated original data after a change phenomenon (the luminance change) expressed in Notify is generated. The original data in a case where the sensor 11 is the extended DVS is the luminance image $L^n$, that is, set data in which the pixel (x, y) of the luminance image $L^n(x, y)$ is set to all the pixels. Therefore, the original data in a case where the event type is Update is a luminance image $L^{n-1}$ before a luminance change at a time $t^n$ is applied, and the original data in a case where the event type is Notify is a luminance image $L^n$ after a luminance change at a time $t^n$ has occurred.

In the default, the event class is set by the topic manager 16 in accordance with a topic, that is, observation target data to be notified as the event data. However, depending on a type of the sensor 11, the event class may be fixedly set in advance, such as a case where priority specific to the sensor 11 is designated. Alternatively, the event class may be set by performing some negotiation between with the event consumer 14, which is a data transfer destination. In any case where the event class is set by any method, the event class can be changed in accordance with a traffic situation or the like in the network.

FIGS. 3 to 6 illustrate a data example to be adopted as the topic ID.

Figure 3:
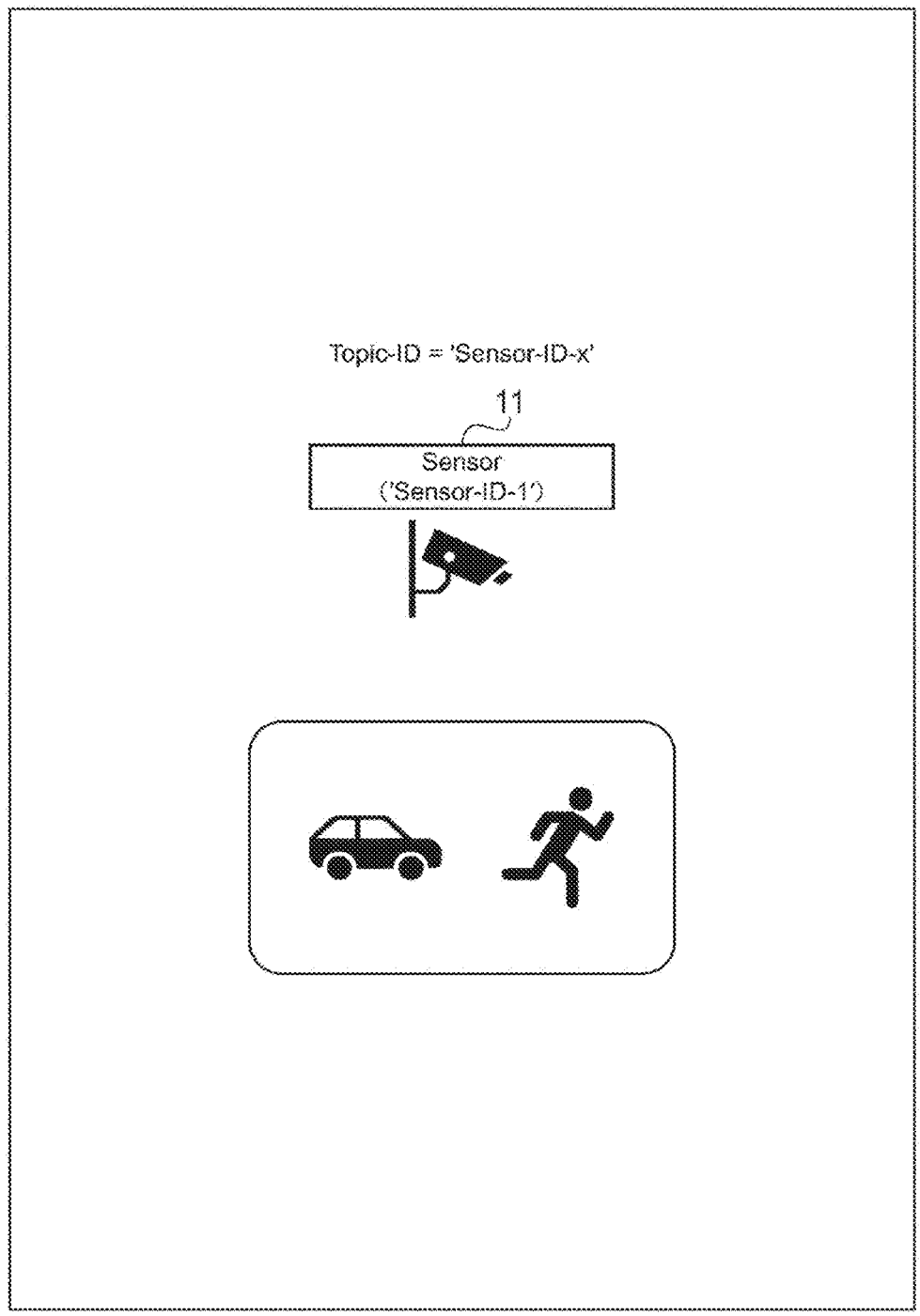
FIG. 3 is a diagram for explaining an example of data adopted as a topic ID.

FIG. 3 illustrates an example in which a sensor ID (sensor identification information) for globally uniquely identifying the sensor 11 is adopted as the topic ID. In the example of FIG. 3, "Sensor-ID-1", which is the sensor ID, is used as it is as the topic ID.

Figure 4:
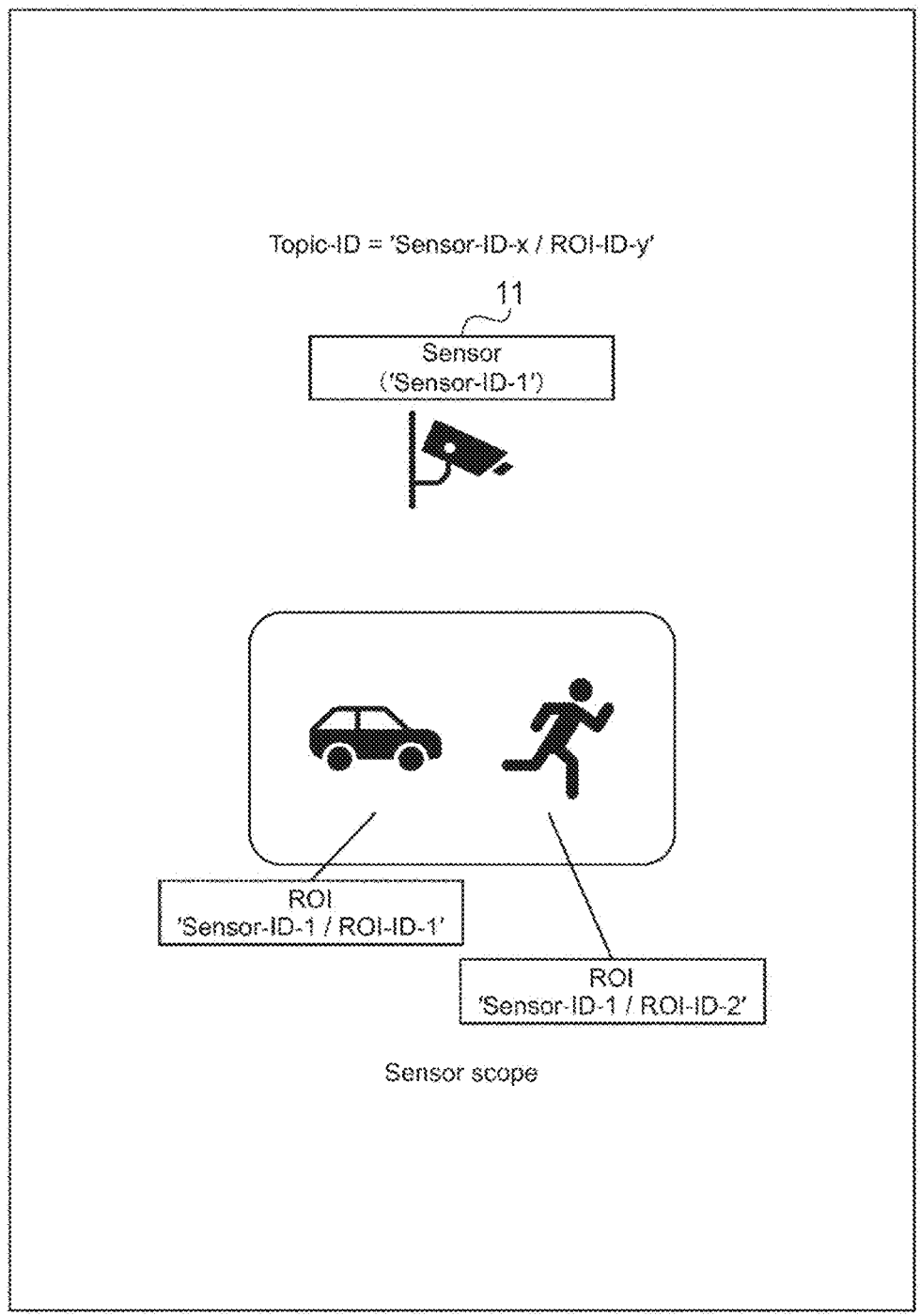
FIG. 4 is a diagram for explaining an example of data adopted as the topic ID.

FIG. 4 illustrates an example in which a combination of a sensor ID for globally uniquely identifying the sensor 11 and a ROI-ID (object identification information) for identifying a specific object region (a region of interest: ROI) in an image that is sensor data is adopted as the topic ID.

In the example of FIG. 4, the sensor ID is "Sensor-ID-1", and "ROI-ID-1" and "ROI-ID-2" for identifying the object region ROI are individually assigned to two objects of a car and a person in an image generated by the sensor 11. "Sensor-ID-1/ROI-ID-1" is set as the topic ID for the car object, and "Sensor-ID-1/ROI-ID-2" is set as the topic ID for the person object. The ROI-ID for identifying the object region ROI is only required to be unique in the sensor.

Figure 5:
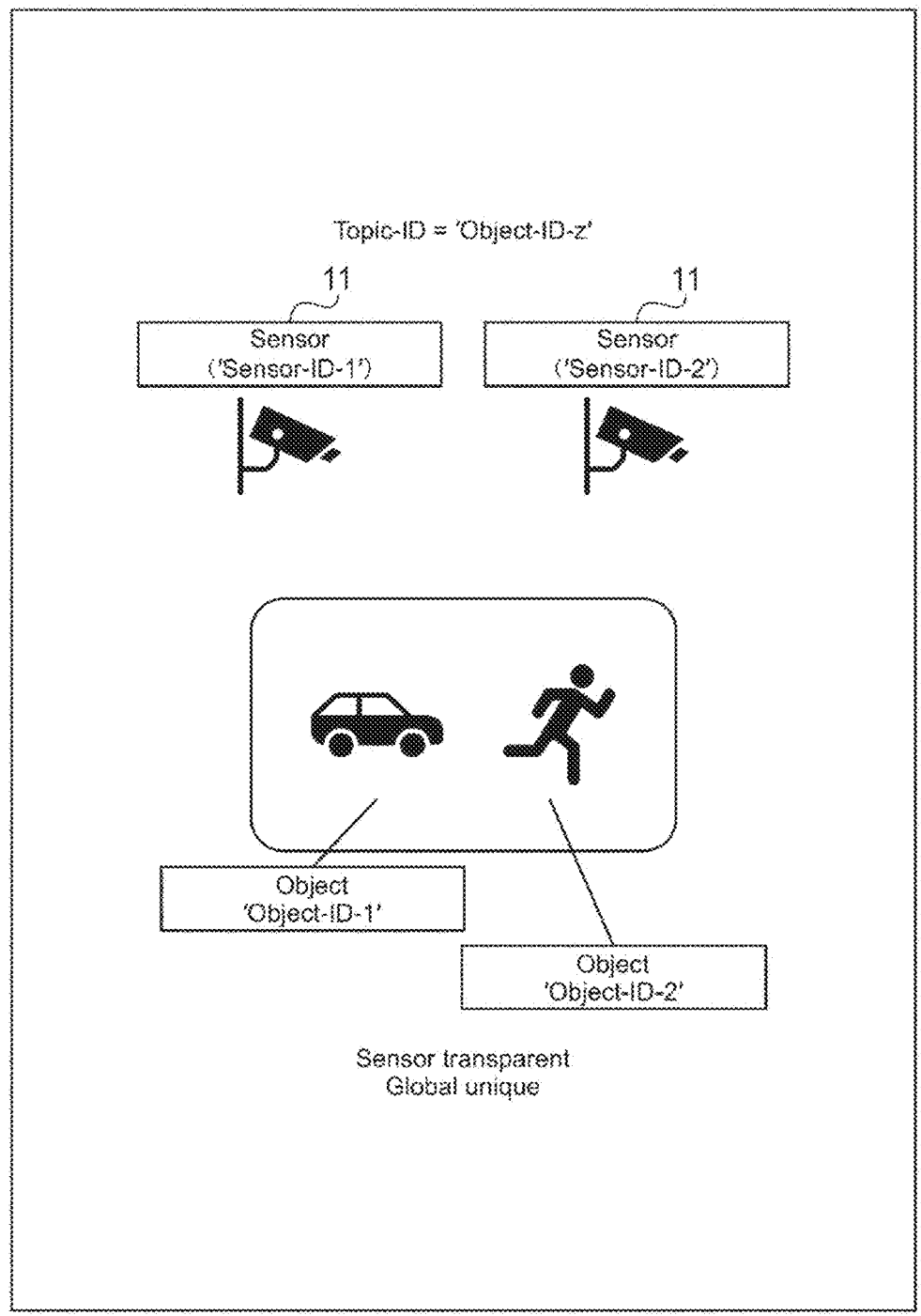
FIG. 5 is a diagram for explaining an example of data adopted as the topic ID.

FIG. 5 illustrates an example in which an object ID (global object identification information) for globally uniquely identifying an object detected in an image that is sensor data is adopted as the topic ID.

In FIG. 5, in an image generated by the sensor 11, "Object-ID-1" is assigned to a car object, and "Object-ID-2" is assigned to a person object, to be globally unique. The object ID is information that enable identification of a target object across a plurality of the sensors 11. "Object-ID-1" is set as the topic ID for the car object, and "Object-ID-2" is set as the topic ID for the person object.

Figure 6:
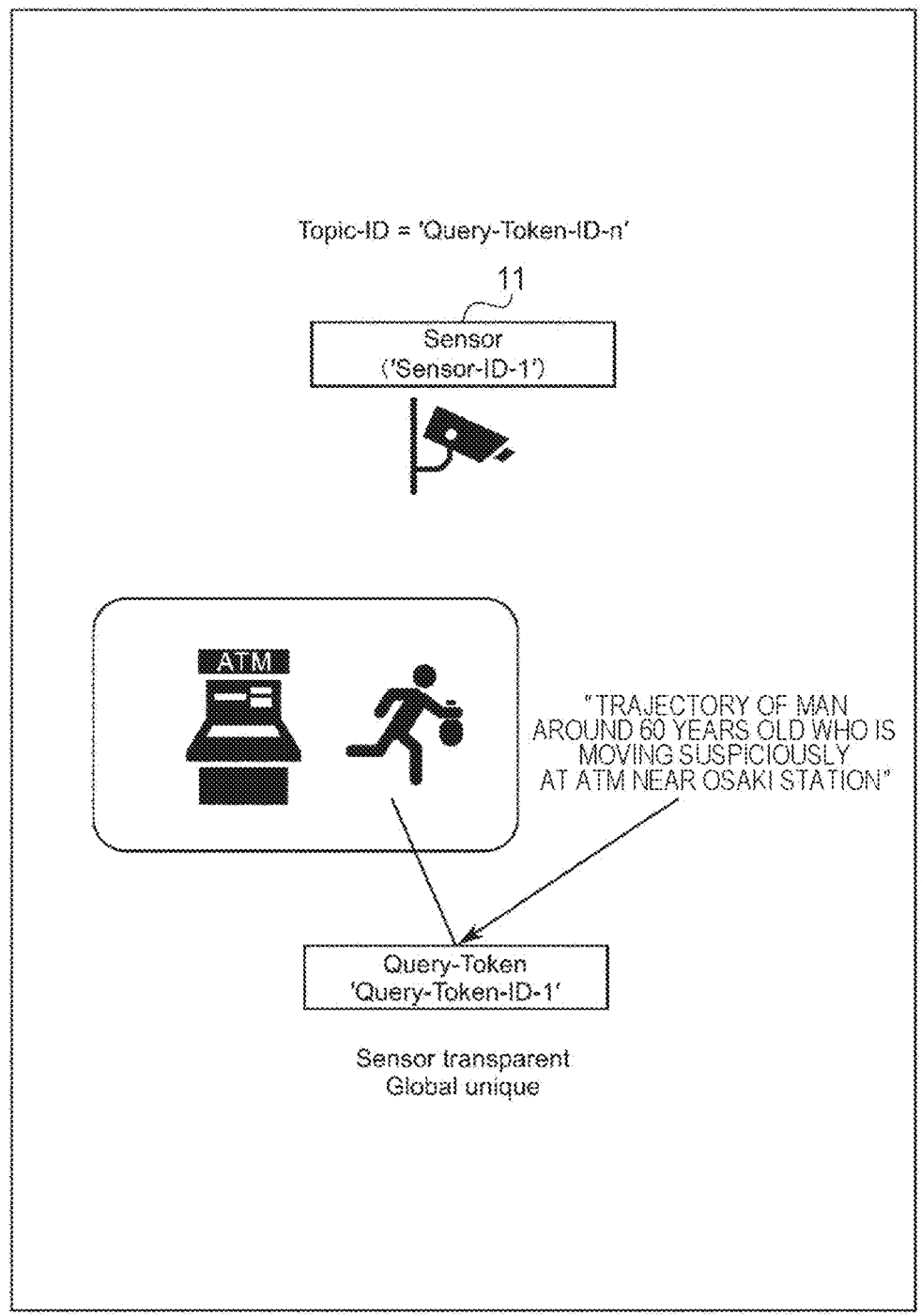
FIG. 6 is a diagram for explaining an example of data adopted as the topic ID.

FIG. 6 illustrates an example in which a query ID (query identification information) for identifying a query for observation target data is adopted as the topic ID.

The query ID for identifying the query for observation target data is set by the event consumer 14 (or an event subscriber 116 in FIG. 29) which is a side using the data.

For example, in a case where a query such as "a trajectory of a man around 60 years old who is moving suspiciously at an ATM near Osaki Station" is set as a query for specifying an event by the event consumer 14, the query ID that is query identification information for identifying the query is assigned by the topic manager 16, and is notified to the event consumer 14 and the sensor 11. The query ID is determined to be globally unique regardless of the sensor 11. In the example of FIG. 6, "Query-Token-ID-1" is assigned as the query ID of the above-described query, and is set as the topic ID.

<3. Sending Control of Event Data and Original Data>

Next, with reference to a flowchart of FIG. 7, sending control of event data and original data acquired by the sensor 11 will be described.

Note that, in the description in and after FIG. 7, a predetermined pixel (x, y) among a plurality of pixels included in the sensor 11 will be described, but all the control described below can be executed for the entire luminance image L by applying the pixel (x, y) to each of all the pixels of the sensor 11.

First, in step S1, the sensor 11 executes "Capture Original". Specifically, the sensor 11 acquires a luminance image $L^{n-1}(x, y)$ at a time $t^{n-1}$ as original data.

In step S2, the sensor 11 executes "Detect Update & Send Update". Specifically, the sensor 11 detects a luminance image $L^n(x, y)$ at a time $t^n$, and supplies event data $e^n = \{x,$ y, $p''$, $t''$} indicating a luminance change between the luminance image $L^{n-1}(x, y)$ at the time $t^{n-1}$ and the luminance image $L^n(x, y)$ at the time $t^n$, to the event producer 12 together with the luminance image $L^{n-1}(x, y)$ at the time $t^{n-1}$ which is the original data. The event producer 12 acquires the event data $e''$ and the luminance image $L^{n-1}(x, y)$.

The event producer 12 executes "Generate Update Event" in step S3, and executes "Send Update Event" in step S4. Specifically, the event producer 12 generates and sends event data to the event consumer 14. In this processing, the event $e''$ supplied as a luminance change amount from the sensor 11 is sent as it is to the event consumer 14 as the event data.

The processing of steps S2 to S4 is repeatedly executed a plurality of times as necessary, in some cases.

In step S5, the event consumer 14 executes "Request Original". Specifically, the event consumer 14 requests the event producer 12 for the original data by designating an original reference (Original Ref) included in the event data $e''$.

Upon receiving the request for the original data from the event consumer 14, the event producer 12 executes "Send Original" in step S6. That is, the event producer 12 sends the luminance image $L^{n-1}(x, y)$ at the time $t^{n-1}$ as the original data to the event consumer 14.

In step S7, the event consumer 14 acquires the luminance image $L^{n-1}(x, y)$ at the time $t^{n-1}$ as the original data sent from the event producer 12, and executes "Update Original & Process Updated Original". Specifically, the event consumer 14 executes a process of recovering the luminance image $L^n(x, y)$ at the time $t^n$ according to Equation (2) described above. In a case where no luminance change has occurred in the pixel (x, y), the luminance image $L^n(x, y)$ becomes $L^n(x, y) = L^{n-1}(x, y)*1$ with c=0.

Moreover, the event consumer 14 performs predetermined application processing using the updated luminance image $L^n(x, y)$, for example, image rendering, analysis processing, or the like.

The above processing of steps S1 to S7 is repeatedly executed. The event producer 12 erases the original data and the event data sent in the past at an appropriate timing such as after elapse of a predetermined time after sending of the original data.

According to the sending control of the event data and the original data described above, by sending the event data and acquiring the original data as necessary, it is possible to reduce network traffic and efficiently perform transfer processing on a large amount of data.

Figure 7:
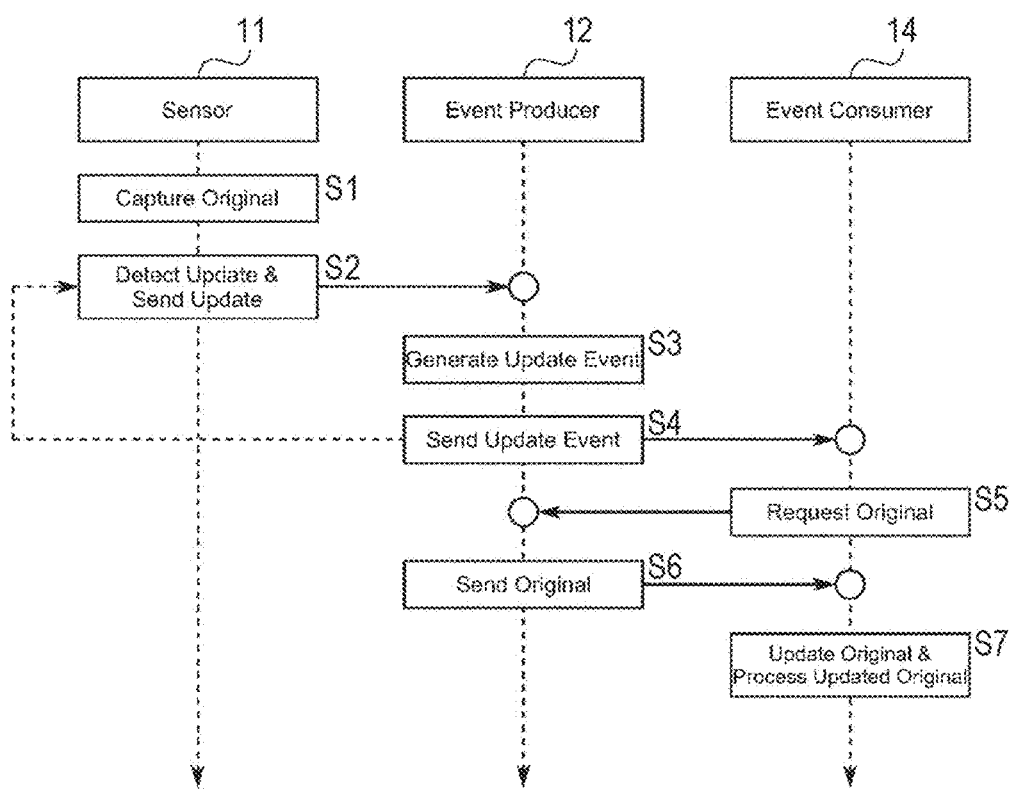
FIG. 7 is a flowchart for explaining sending control of event data and original data.

The sending control described with reference to FIG. 7 is an example in which the event producer 12 receives the request from the event consumer 14 and then sends the original data. However, there is also a method of unilaterally sending the original data, for example, periodically sending the original data at a fixed period, or the like.

Figure 8:
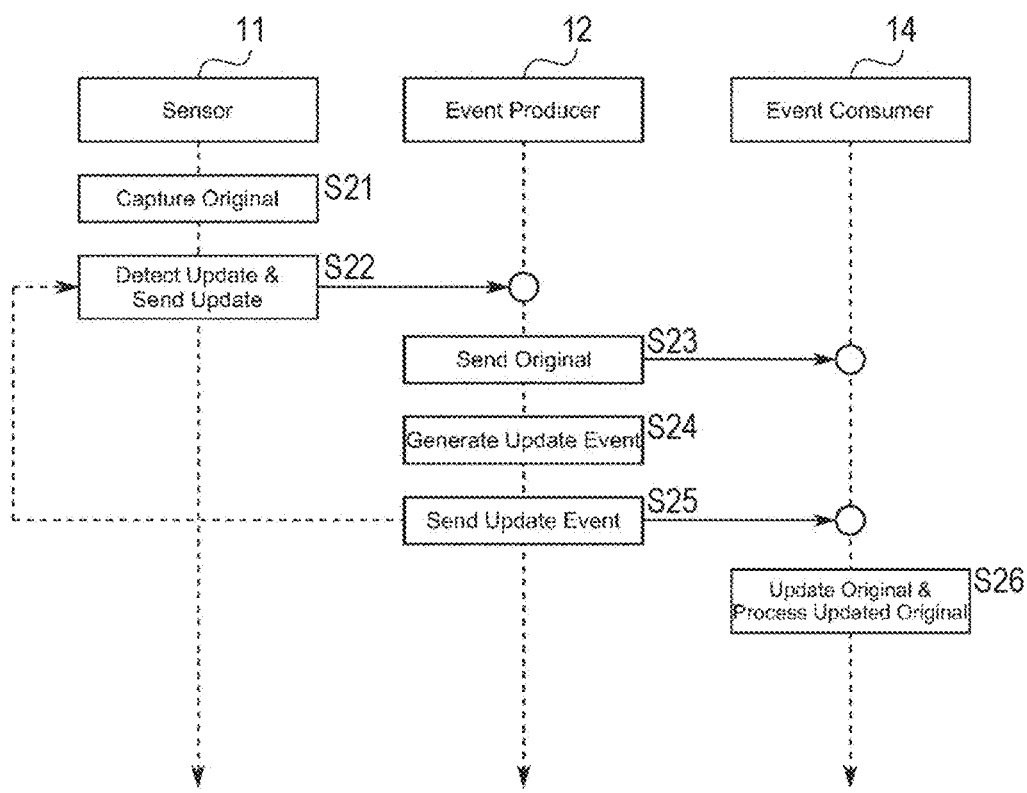
FIG. 8 is a flowchart for explaining another example of sending control of event data and original data.

FIG. 8 is another example of sending control of event data and original data, and is a flowchart of illustrating the sending control in a case of periodically sending the original data.

In this processing, first, in step S21, the sensor 11 executes "Capture Original". That is, the sensor 11 acquires a luminance image $L^{n-1}(x, y)$ at a time $t^{n-1}$ as the original data.

In step S22, the sensor 11 executes "Detect Update & Send Update". That is, the sensor 11 detects a luminance image $L^n(x, y)$ at a time $t^n$, and notifies the event producer 12 of event data $e''=\{x, y, p'', t''\}$ indicating a luminance change between the luminance image $L^{n-1}(x, y)$ at the time $t^{n-1}$ and the luminance image $L^n(x, y)$ at the time $t^n$, together with the luminance image $L^{n-1}(x, y)$ at the time $t^{n-1}$ which is the original data. The event producer 12 acquires the event data $e''$ and the luminance image $L^{n-1}(x, y)$.

In step S23, the event producer 12 executes "Send Original". That is, the event producer 12 sends the luminance image $L^{n-1}(x, y)$ at the time $t^{n-1}$ which is the original data, to the event consumer 14. The event consumer 14 receives the luminance image $L^{n-1}(x, y)$.

The event producer 12 executes "Generate Update Event" in step S24, and executes "Send Update Event" in step S25. The processing in steps S24 and S25 is similar to the processing in steps S3 and S4 in FIG. 7, and the event $e''$ at the time $t''$ notified as the luminance change amount from the sensor 11 is sent as it is to the event consumer 14 as the event data.

The processing of steps S22 to S25 is repeatedly executed a plurality of times as necessary, in some cases.

In step S26, the event consumer 14 acquires the event data $e''$ at the time $t''$ sent from the event producer 12, and executes "Update Original & Process Updated Original". That is, the event consumer 14 uses the event data $e''$ at the time $t''$ and the luminance image $L^{n-1}(x, y)$ at the time $t^{n-1}$ acquired before the event data $e''$, to execute the process of recovering the luminance image $L^n(x, y)$ at the time $t''$ with Equation (2) described above. Subsequently, the event consumer 14 performs predetermined application processing using the updated luminance image $L^n(x, y)$, for example, image rendering, analysis processing, or the like.

The event producer 12 erases the original data and the event data sent in the past at an appropriate timing such as after elapse of a predetermined time after sending of the original data.

The above processing of steps S21 to S26 is repeatedly executed. In a case where the event consumer 14 receives the original data redundantly, the redundant original data is discarded.

<4. Accumulation Processing of Event Data>

In the data sending control described with reference to FIG. 7, in "Generate Update Event" and "Send Update Event" executed by the event producer 12, the process of transferring the event data as it is from the sensor 11 to the event consumer 14 is executed.

However, in practice, traffic increases if the above-described sending control is performed for every one pixel. Therefore, a process is executed in which the event producer 12 accumulates update data to some extent and sends to the event consumer 14, or the event consumer 14 accumulates update data to some extent and then requests for the original data.

Figure 9:
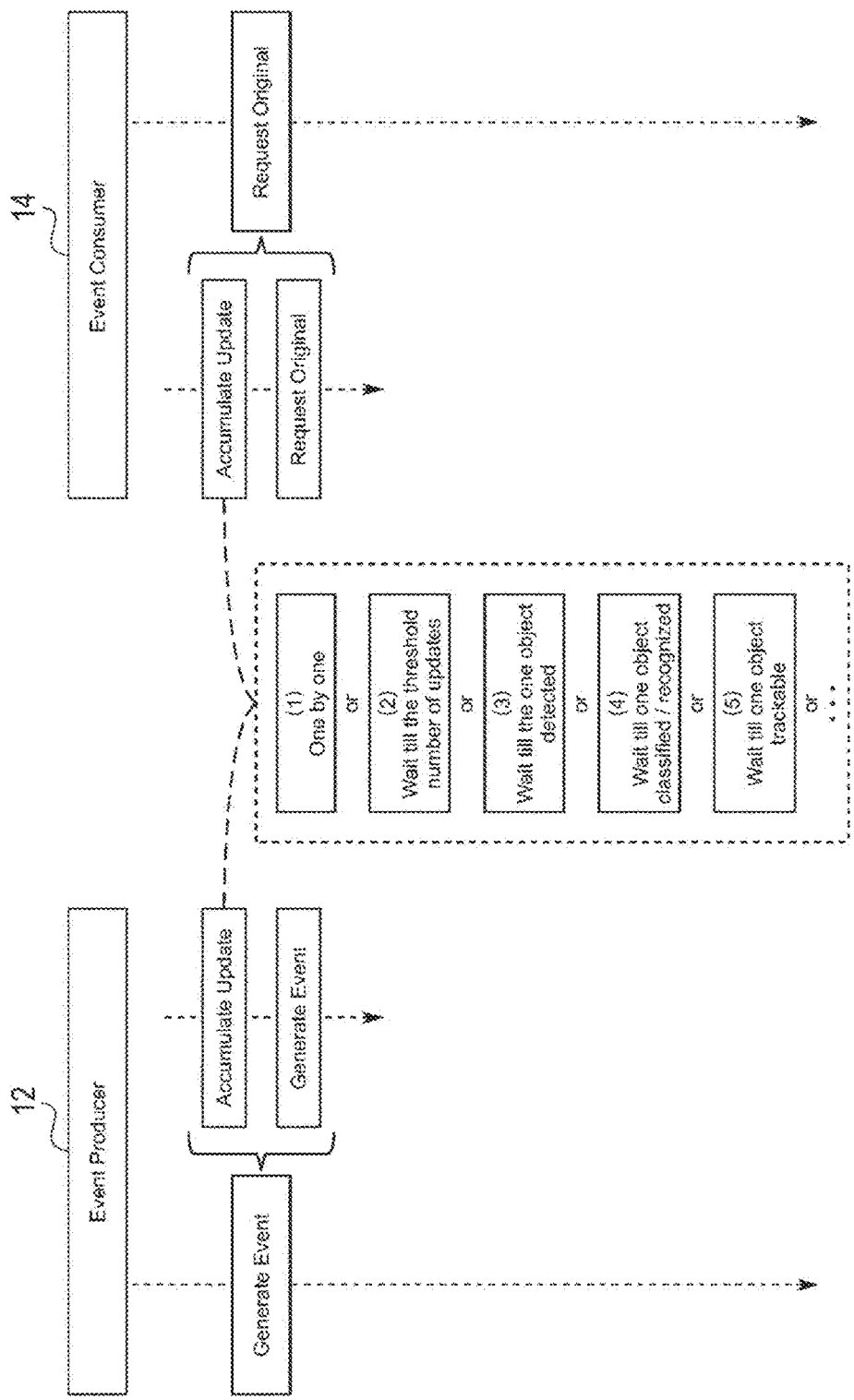
FIG. 9 is a diagram for explaining accumulation processing of event data.

In other words, as illustrated on a left side of FIG. 9, the process of "Generate Update Event" executed by the event producer 12 can include accumulation processing ("Accumulate Update") of accumulating a plurality of pieces of event data, which is update data, corresponding to a luminance change amount.

Alternatively, as illustrated on a right side of FIG. 9, the process of "Request Original" executed by the event consumer 14 can include accumulation processing ("Accumulate Update") of accumulating a plurality of pieces of event data, which is update data, corresponding to a luminance change amount.

As a level (hereinafter, referred to as an accumulation level) for the event producer 12 or the event consumer 14 to complete the process of accumulating the update data to some extent, for example, the following five levels (1) to (5) are considered.

Accumulation level (1) is a level at which sending is immediately performed in any case after one piece of net event data subjected to noise removal is generated. According to this Accumulation level (1), the event producer 12 transfers the acquired event data as it is as illustrated in FIG. 7.

Accumulation level (2) is a level at which sending is performed after accumulating until event data of a plurality of pixels reaches a value equal to or more than a predetermined threshold value determined in advance.

Accumulation level (3) is a level at which sending is performed after accumulating until a region (a rectangular region or an edge region) of an object of a subject can be extracted.

Accumulation level (4) is a level at which sending is performed after accumulating until an object of a subject can be recognized (subjected to content understanding or classification) and identified to be an observation target.

Accumulation level (5) is a level at which sending is performed after accumulating until at least one object of a subject can be recognized as a cluster (a set of pixels), and a trajectory of the object can be tracked (starts to move).

Furthermore, there are various variations according to a level and a combination of AI processing. These Accumulation levels (1) to (5) can be set for each topic ID.

The process of accumulating a plurality of pieces of event data can also be performed by being divided between the event producer 12 side and the event consumer 14 side.

Figure 10:
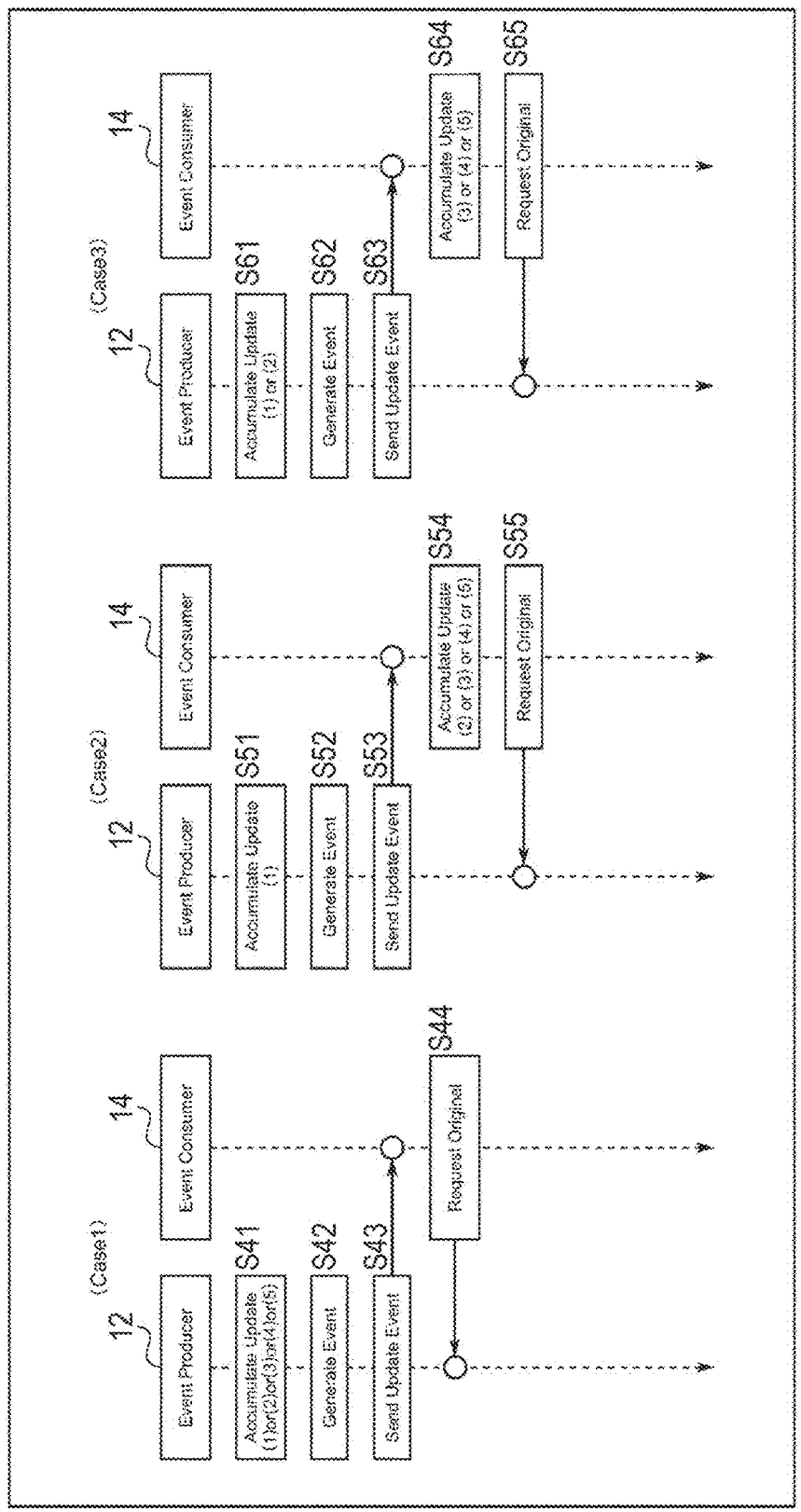
FIG. 10 is a diagram for explaining the accumulation processing of event data.

(Case 1) in FIG. 10 illustrates a sending control example in which the event producer 12 side performs "Generate Update Event" and "Send Update Event" after accumulating one or more pieces of event data at any of Accumulation levels (1) to (5) described above.

Specifically, in step S41, the event producer 12 accumulates one or more pieces of event data at any of Accumulation levels (1) to (5) described above. Then, the event producer 12 executes "Generate Update Event" in step S42, and executes "Send Update Event" in step S43. In step S44, the event consumer 14 executes "Request Original" to request the event producer 12 for original data.

(Case 2) in FIG. 10 illustrates a sending control example in which the event consumer 14 side performs "Request Original" after accumulating a plurality of pieces of event data at any of Accumulation levels (2) to (5) described above.

Specifically, in step S51, when update data is generated in one pixel by acquiring event data from the sensor 11, the event producer 12 executes "Generate Update Event" in step S52, and executes "Send Update Event" in step S53. In step S54, the event consumer 14 receives the event data from the event producer 12 and accumulates a plurality of pieces of event data at any of Accumulation levels (2) to (5) described above. Then, in step S55, the event consumer 14 executes "Request Original", and requests the event producer 12 for original data.

(Case 3) in FIG. 10 illustrates a sending control example in which the event consumer 14 side performs "Request Original" after accumulating a plurality of pieces of event data at any of Accumulation levels (3) to (5) described above.

Specifically, in step S61, the event producer 12 accumulates one or more pieces of event data at one of Accumulation level (1) or (2) described above. Then, the event producer 12 executes "Generate Update Event" in step S62, and executes "Send Update Event" in step S63. In step S64, the event consumer 14 receives event data from the event producer 12 and accumulates a plurality of pieces of event data at any of Accumulation levels (3) to (5) described above. Then, in step S65, the event consumer 14 executes "Request Original", and requests the event producer 12 for original data.

For example, assuming that, after a luminance image $L^1(x, y)$ at a time $t^1$ is acquired by the event producer 12, the event consumer 14 collectively acquires 10 pieces of event data $e^2$ to $e^{11}$ from a time $t^2$ to a time $t^{11}$. Thereafter, when the event consumer 14 executes "Request Original" to request the event producer 12 for original data, the luminance image $L^1(x, y)$ at the time $t^1$ is sent as the original data from the event producer 12.

Figure 11:
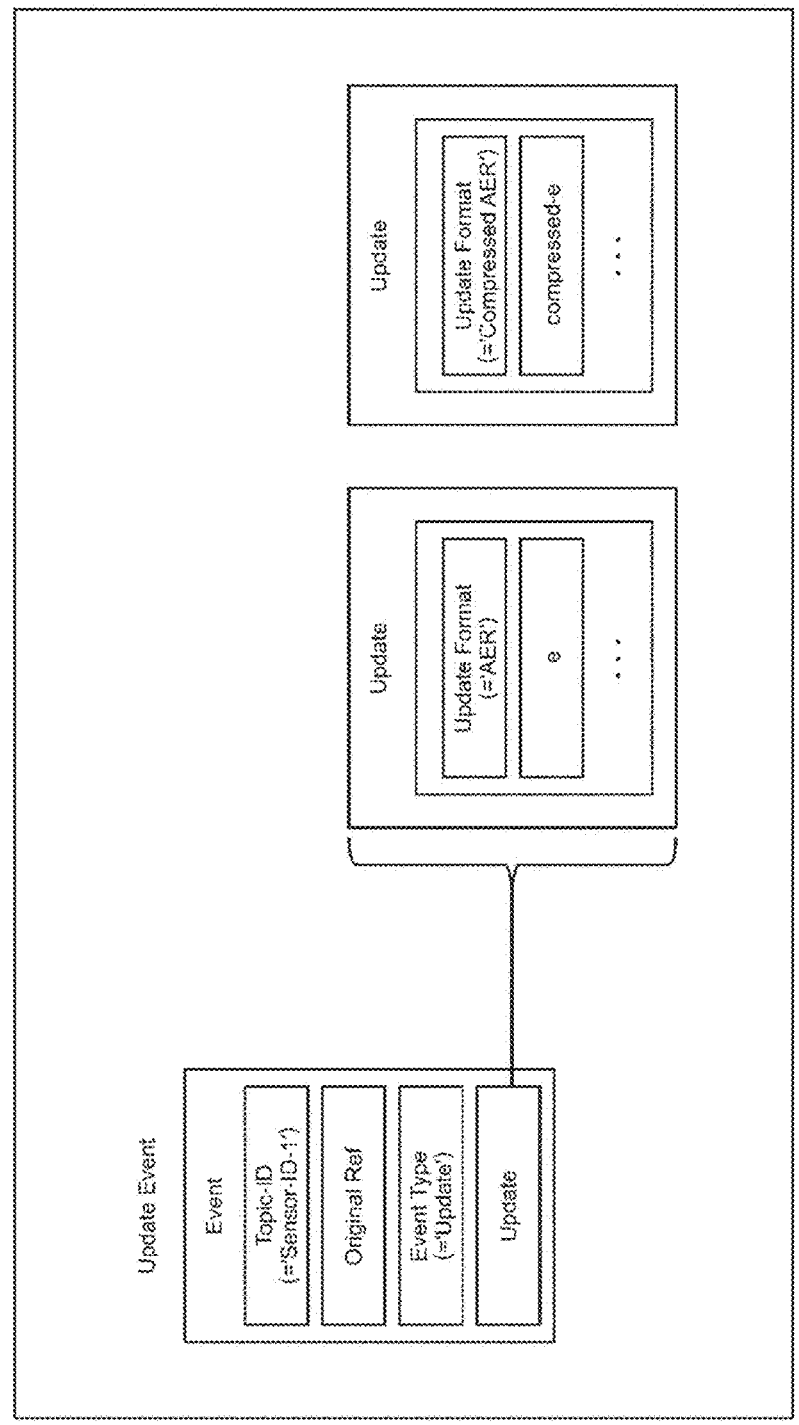
FIG. 11 is a diagram illustrating a data format of event data in a case where an event type is Update.

FIG. 11 illustrates a data format of event data in a case where an event type is Update.

As described with reference to FIG. 2, the event data includes the topic ID (Topic ID), the original reference (Original Ref), and the event type. In a case where the event type is Update, one or more pieces of event data are further stored as update data (Update).

The topic ID (Topic ID) stores, for example, a sensor ID, a combination of the sensor ID and a ROI-ID, an object ID, a query ID, and the like. In the example of FIG. 11, "Sensor-ID-1", which is the sensor ID for globally uniquely identifying the sensor 11, is stored.

In the event type, Update is stored.

As specific data of the update data, one or a plurality of pieces of the event data e is stored according to an AER format of Equation (1) described above.

Alternatively, a plurality of pieces of the event data e may be stored in a compressed AER format obtained by compressing the plurality of pieces of the event data e in the AER format.

The compressed AER format will be described.

When k pieces of event data $e^{n-k+1}, \ldots, e^{n-2}, e^{n-1}, e^n$ at times $t^{n-k+1}, \ldots, t^{n-2}, t^{n-1}, t^n$ of the same coordinates (x, y) are collectively expressed, $(x, y, p^{n-k+1}, \ldots, p^{n-2}, p^{n-1}, p^n, t^{n-k+1}, \ldots, t^{n-2}, t^{n-1}, t^n)$ is obtained. However, if time $\Delta t = t^n - t^{n-k+1}$ over the k pieces of event is too large, a delay is increased. Therefore, the time $\Delta t$ and the number of pieces k are dynamically determined to enable the delay to be minimized as much as possible and to be within a temporal resolution requirement of an event requested by an application (the event consumer 14).

In a case where q pieces of data having a positive polarity p and r pieces of data having a negative polarity p are generated among the k pieces of event data $e^{n-k+1}, \ldots, e^{n-2}, e^{n-1}, e^n$ in a range of the time $\Delta t$, it can be expressed as compressed-e (x, y, s, $t^n$) according to the compressed AER format since a change amount in a logarithmic luminance in the range of the time $\Delta t$ becomes (q−r)=s.

As described above, in a case where the time resolution is allowed to be coarse in the range of the time $\Delta t$, the number of events to be transferred can be reduced by compressing the plurality of pieces of event data e in the compressed AER format. Note that the range of the time $\Delta t$ may be divided into a plurality of sections, and a plurality of pieces of compressed data of compressed-e (x, y, s, $t^n$) may be stored.

In the event data, information ("Update Format") indicating whether the stored update data is in the AER format or the compressed AER format is also stored.

Assuming that the original data acquired by the event consumer 14 executing "Request Original" is a luminance image $L^{n-k+1}(x, y)$ at a time $t^{n-k+1}$, and the compression event data acquired in the compressed AER format is compressed-e (x, y, s, $t^n$), the luminance image $L^n(x, y)$ at the time $t^n$ can be obtained by the following equation based on the premise that there is no noise.

$$L^n(x,y) = L^{n-k+1}(x,y) * \exp(c*s)$$

By sending after accumulating event data at a predetermined accumulation level by using the accumulation processing, it is possible to further reduce network traffic and efficiently perform transfer processing on a large amount of data.

<5. Identification of Data Based on Topic ID>

Next, identification of data of the event consumer 14 based on the topic ID will be described.

As described with reference to FIG. 11, the event data is transferred including the topic ID. As described with reference to FIGS. 3 to 6, the topic ID is formed by, for example, the sensor ID, a combination of the sensor ID and the ROI-ID, the object ID, the query ID, and the like.

In a case where the topic ID is formed by the sensor ID, event data to be acquired is all the event data issued by the sensor 11.

In a case where the topic ID is a combination of the sensor ID and the ROI-ID or the object ID, event data issued by the sensor 11 can be identified for each object region ROI in an image or each object.

Therefore, the event consumer 14 can extract and process only event data necessary for the self on the basis of the topic ID, with reference to the topic DB 17. That is, the event consumer 14 can view event data received by the self to confirm only event data that is really needed by the self, acquire original data of a source through "Request Original", and recover the latest original data by applying update data. For example, a latest trajectory of only a target object can be tracked by applying only event data related to a movement of the object of interest of the self in the entire image of a certain sensor 11.

In the topic DB 17, a set of the topic ID and the topic description information is stored for every topic. In a case where the topic ID is formed by the sensor ID, various types of attribute information of the sensor 11, for example, position information such as latitude and longitude of the sensor 11, and information such as an image-capturing direction (view port) are stored in the topic description information.

In a case where the topic ID is formed by a combination of the sensor ID and the ROI-ID, information regarding the object region ROI, for example, a region position and a size, an object type (a person, a car, or the like), and the like are stored in the topic DB 17 as the topic description information at a time point when the sensor 11 recognizes the object region ROI.

In a case where the topic ID is formed by the object ID, the topic manager 16 manages the topic DB 17. Specifically, the topic manager 16 assigns a globally unique ID to an object as the object ID, and stores the topic ID and the topic description information in the topic DB 17. Furthermore, the topic manager 16 notifies the event producer 12 connected to the sensor 11 capturing the relevant object, to store the object ID assigned by the topic manager 16 into the topic ID of the event data related to the object.

Also in a case where the topic ID is formed by a query ID associated with a query for observation target data, the topic manager 16 manages the topic DB 17. Specifically, the topic manager 16 sets a search query (for example, "a trajectory of a man around 60 years old who is moving suspiciously at an ATM near Osaki Station") from the event consumer 14 as the topic description information, assigns the query ID, and stores the topic description information in the topic DB 17. Furthermore, the topic manager 16 notifies the event producer 12 connected to the sensor 11 capturing the object corresponding to the query, to store the query ID assigned by the topic manager 16 into the topic ID of the event data related to the object.

In this manner, by enabling the topic ID to be assigned to each sensor 11 or each observation target object in one sensor 11, for example, the event consumer 14 can determine a region of no interest in the entire luminance image L from the sensor 11 on the basis of the topic description information or the like of the topic DB 17, and determine a portion that does not need to be updated to the latest state on the basis of the topic ID. As a result, unnecessary update processing can be omitted.

Furthermore, after all the event data issued by the sensor 11 is acquired, only necessary objects may be extracted on the basis of the topic ID. However, the event consumer 14 may also notify the event producer 12 of a necessary topic ID in advance, to cause the event producer 12 to transfer only the event data related to the necessary object. As a result, event transfer itself can be made efficient, and traffic can be reduced.

Figure 12:
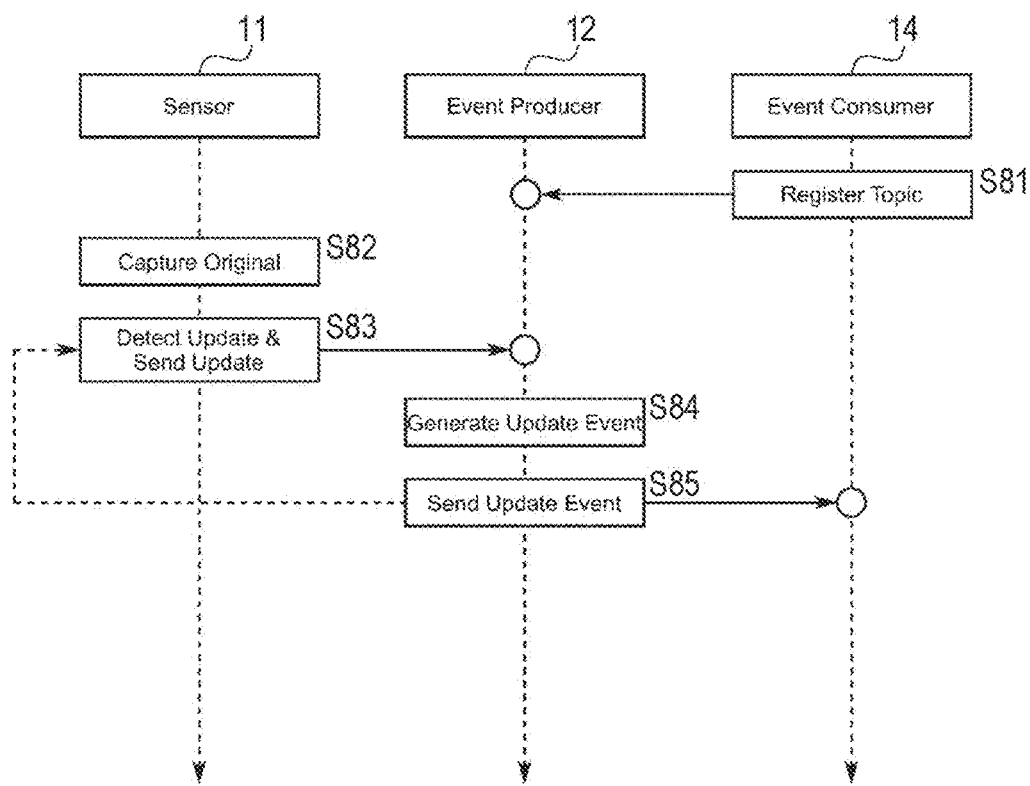
FIG. 12 is a flowchart of sending control including a process of notifying an event producer of the topic ID.

FIG. 12 illustrates a flowchart of sending control including a process in which the event consumer 14 notifies the event producer 12 of a necessary topic ID in advance.

In this processing, first, in step S81, the event consumer 14 executes topic registration processing ("Register Topic") of notifying the event producer 12 of the necessary topic ID. The event producer 12 receives the notified topic ID from the event consumer 14.

The processing of steps S82 to S85 is similar to steps S1 to S4 of the flowchart of FIG. 7, respectively. However, there is a difference in that, among event data acquired from the sensor 11, the event producer 12 sends only event data of the topic ID notified from the event consumer 14, to the event consumer 14.

After step S85, similarly to the sending control in FIG. 7, the event producer 12 sends original data to the event consumer 14 in a case where "Request Original" is notified from the event consumer 14. The event consumer 14 executes a process of recovering the luminance image L, and performs predetermined application processing using the updated luminance image L.

Figure 13:
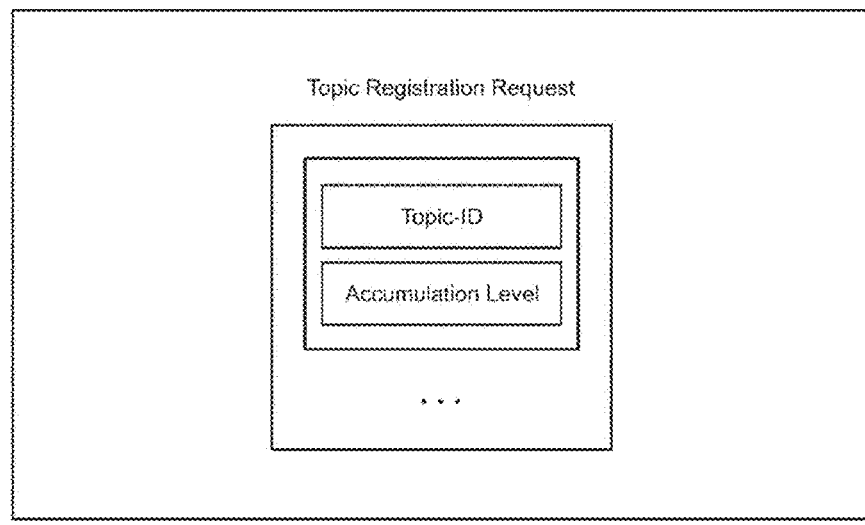
FIG. 13 is a diagram illustrating a data example of a topic registration request.

FIG. 13 illustrates a data example of a topic registration request ("Topic Registration Request") notified from the event consumer 14 to the event producer 12 in the topic registration processing of step S81.

As illustrated in FIG. 13, as the topic registration request, the event consumer 14 can notify of the level of the accumulation processing performed by the event producer 12, that is, Accumulation levels (1) to (5), together with the topic ID corresponding to the object or the like necessary for the self. In a case where a plurality of topics is assigned to event data issued by one sensor 11, the accumulation level can be designated for each topic.

<6. Sending Control in Case where Event Type is Notify>

In the above description, the processing in a case where the event type is Update has been described. Next, processing in a case where the event type is Notify will be described.

For example, in a case where a content of an update change amount is very large, or the like, the event producer 12 sends event data whose event type is Notify, and notifies the event consumer 14 of only of a fact that the update has occurred.

Figure 14:
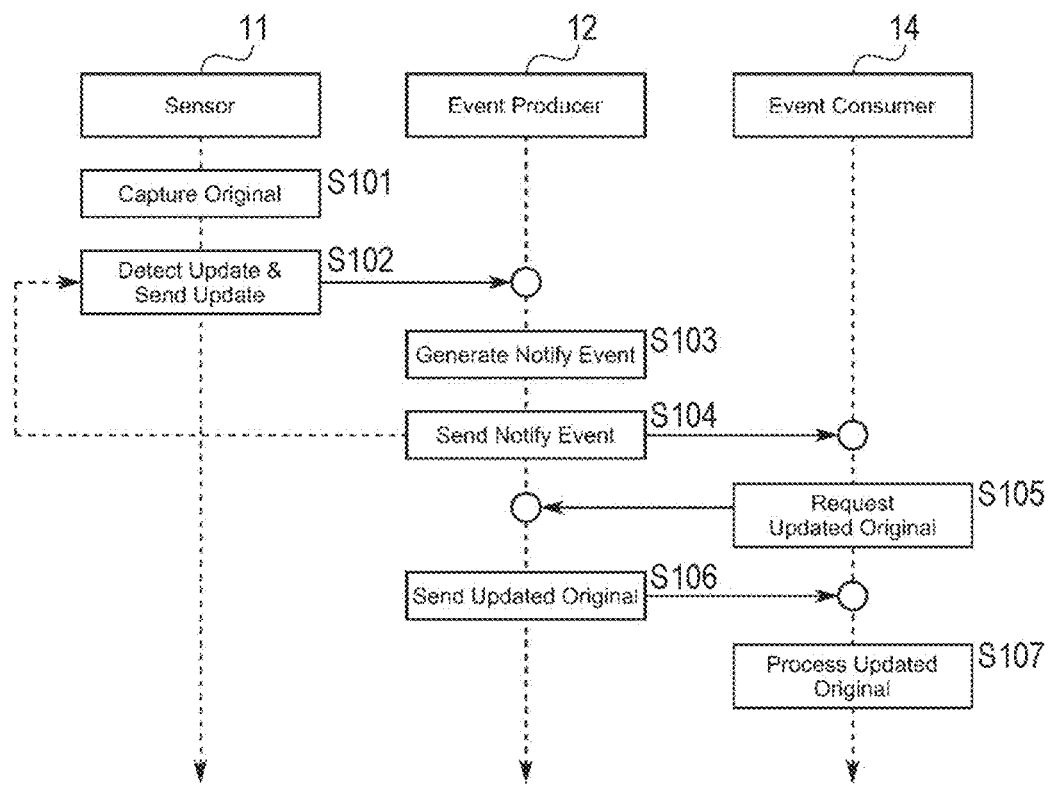
FIG. 14 is a flowchart for explaining sending control of event data and original data in a case where the event type is Notify.

FIG. 14 is a flowchart for explaining sending control of event data and original data in a case where the event type is Notify. This processing corresponds to the process of FIG. 7 in a case where the event type is Update.

First, in step S101, the sensor 11 executes "Capture Original". Specifically, the sensor 11 acquires a luminance image $L^{n-1}(x, y)$ at a time $t^{n-1}$ as original data.

In step S102, the sensor 11 executes "Detect Update & Send Update". That is, the sensor 11 detects a luminance image $L^n(x, y)$ at a time $t^n$, and notifies the event producer 12 of event data $e^n=\{x, y, p^n, t^n\}$ indicating a luminance change between the luminance image $L^{n-1}(x, y)$ at the time $t^{n-1}$ and the luminance image $L^n(x, y)$ at the time $t^n$, together with the luminance image $L^{n-1}(x, y)$ at the time $t^{n-1}$ which is the original data. The event producer 12 acquires the event data $e^n$ and the luminance image $L^{n-1}(x, y)$.

The event producer 12 executes "Generate Notify Event" in step S103, and executes "Send Notify Event" in step S104. Specifically, the event producer 12 generates and sends event data whose event type is Notify, to the event consumer 14. The event data in a case where the event type is Notify will be described later.

The processing of steps S102 to S104 is repeatedly executed a plurality of times as necessary, in some cases.

In step S105, the event consumer 14 executes "Request Updated Original". Specifically, the event consumer 14 requests the event producer 12 for updated original data to which the updated change amount has been applied.

Upon receiving the updated request for the original data from the event consumer 14, the event producer 12 executes "Send Updated Original" in step S106.

Specifically, the event producer 12 sends the luminance image $L^n(x, y)$ at the time $t^n$ to the event consumer 14 as the updated original data.

In step S107, the event consumer 14 acquires the luminance image $L^n(x, y)$ at the time $t^n$ that is the updated original data sent from the event producer 12, and executes "Process Updated Original". That is, the event consumer 14 performs predetermined application processing using the acquired updated luminance image $L^n(x, y)$ at the time $t^n$, for example, image rendering, analysis processing, or the like.

Figure 15:
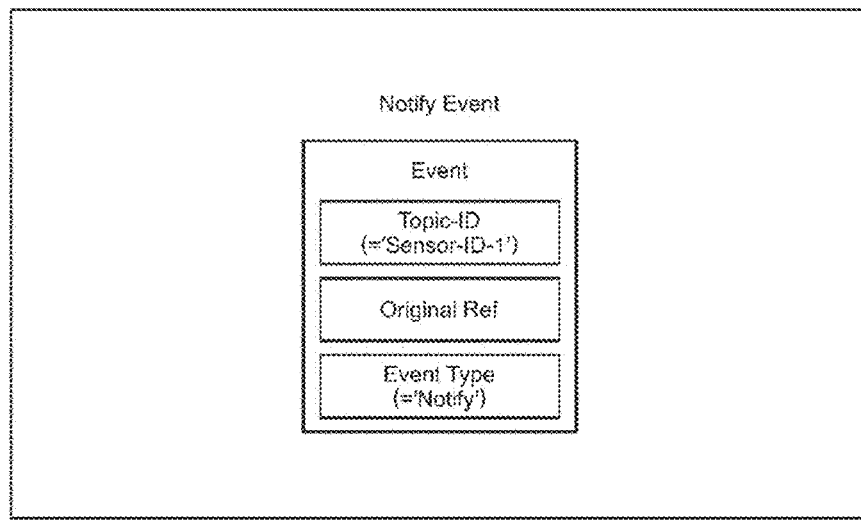
FIG. 15 is a diagram illustrating a data format of event data in a case where the event type is Notify.

FIG. 15 illustrates a data format of event data in a case where the event type is Notify. FIG. 15 corresponds to the data format of the event data of FIG. 11 in a case where the event type is Update.

In a case where the event type is Notify, the event data includes a topic ID (Topic ID), an original reference (Original Ref), and an event type.

The topic ID (Topic ID) stores, for example, a sensor ID, a combination of the sensor ID and a ROI-ID, an object ID, a query ID, and the like. In the example of FIG. 15, "Sensor-ID-1", which is the sensor ID for globally uniquely identifying the sensor 11, is stored.

The original reference (Original Ref) stores a reference address of the updated original data, that is, a reference address corresponding to the luminance image $L^n(x, y)$ at the time $t^n$ in the processing example of FIG. 14.

In the event type, Notify is stored.

As described above, in a case where the event type is Notify, the event data of the update change amount (Event-Type='Update') is not sent to the event consumer 14, and only the updated original data is sent to the event consumer 14.

According to the sending control of the event data and the original data in the case where the event type is the Notify above, the event producer 12 sends the event data indicating a fact that there has been a change, and the event consumer 14 acquires the original data as necessary. As a result, network traffic can be reduced, and transfer processing can be efficiently performed on a large amount of data.

<7. Accumulation Processing of Event Data>

The accumulation processing of event data in a case where the event type is Notify will be described.

Figure 16:
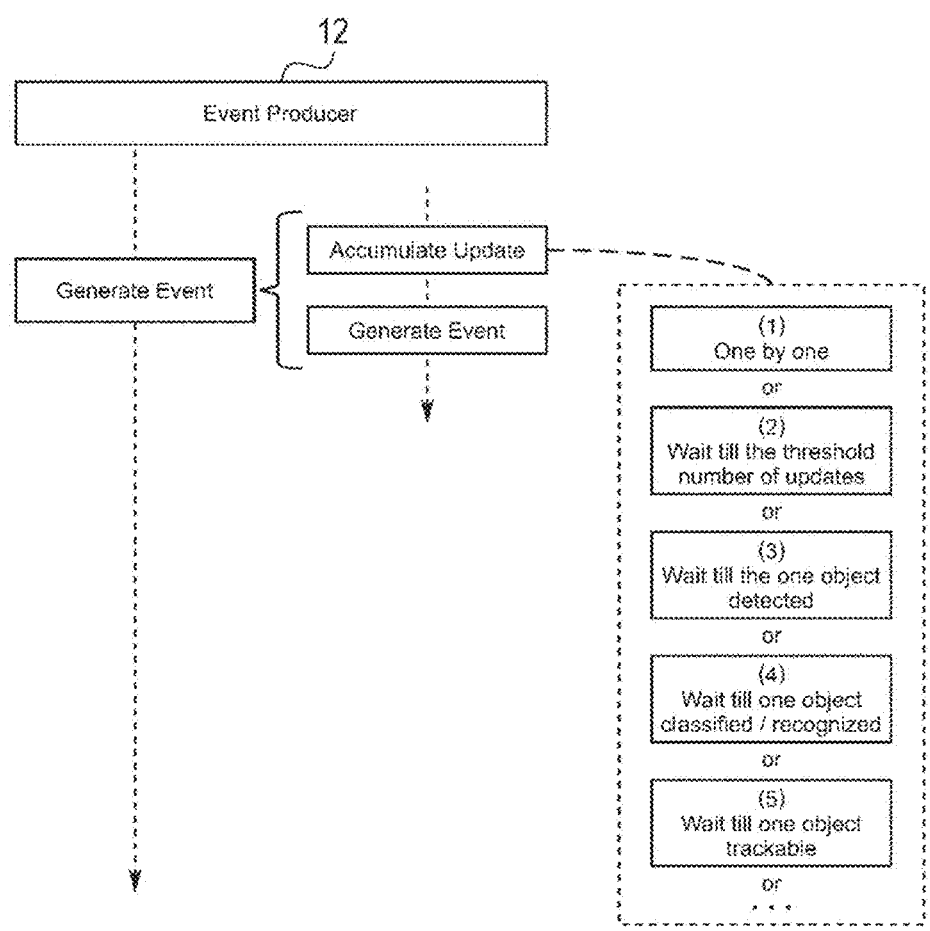
FIG. 16 is a diagram for explaining the accumulation processing of event data in a case where the event type is Notify.

In a case where the event type is Notify, the event data of an updated change amount is not sent to the event consumer 14, and thus the event consumer 14 side cannot perform the accumulation processing. Therefore, in a case where the accumulation processing is performed, as illustrated in FIG. 16, a process of accumulating one or more pieces of event data at any of Accumulation levels (1) to (5) is performed only on the event producer 12 side. In other words, among (Case 1), (Case 2), and (Case 3) in FIG. 10 in a case where the event type is Update, only processing corresponding to (Case 1) is enabled.

Figure 17:
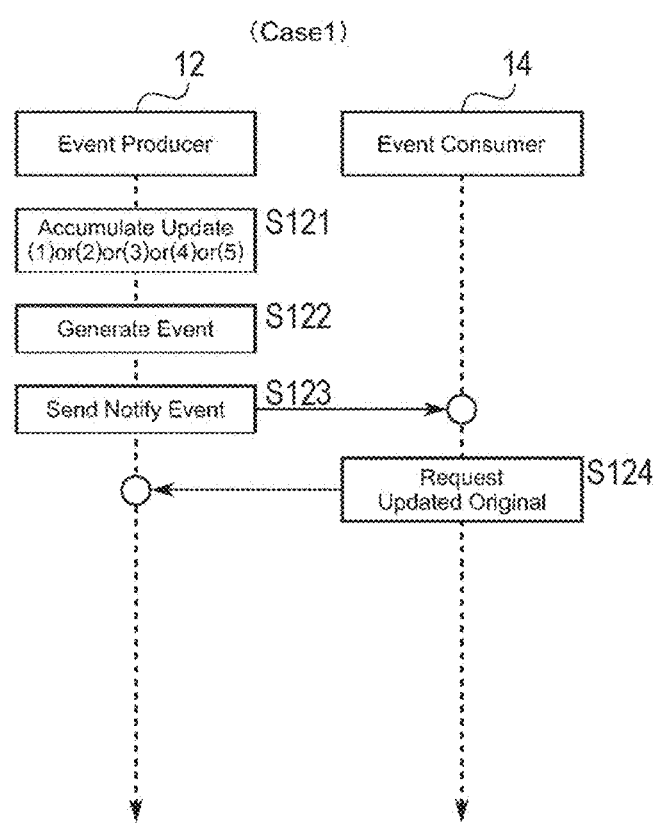
FIG. 17 is a diagram for explaining the accumulation processing of event data in a case where the event type is Notify.

FIG. 17 illustrates a sending control example in which the accumulation processing is performed in a case where the event type is Notify.

Specifically, in step S121, the event producer 12 accumulates one or more pieces of event data at any of Accumulation levels (1) to (5) described above. Then, the event producer 12 executes "Generate Notify Event" in step S122, and executes "Send Notify Event" in step S123. In step S124, the event consumer 14 executes "Request Updated Original" to request the event producer 12 for original data.

Here, in a case where the level of the accumulation processing is (3) to (5) among Accumulation levels (1) to (5) described above, and accumulation is performed as individualized data that is individualized in accordance with a requirement of an application by AI processing or the like, the individualized data can be passed as it is to the event consumer 14, instead of the updated original data.

Figure 18:
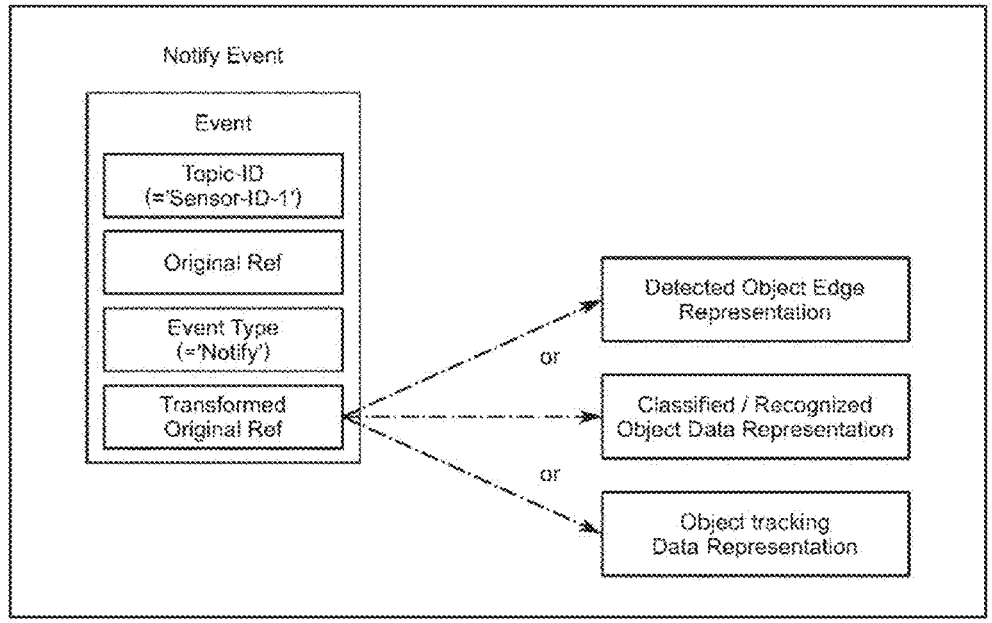
FIG. 18 is a format obtained by extending the data format of FIG. 15.

FIG. 18 is a format obtained by extending a data format in a case where the event type illustrated in FIG. 15 is Notify, and illustrates a data format of the event data in which the individualized data can also be passed to the event consumer 14 in addition to the updated original data.

In this data format, an individualized data reference (Transformed Original Ref) is stored in addition to the topic ID, the original reference, and the event type.

In the individualized data reference, a reference address of the individualized data is stored. Specifically, in a case where the accumulation level is Level (3), the reference address of the individualized data representing a rectangular region of an object of a subject or an edge region of the object is stored. In a case where the accumulation level is Level (4), the reference address of the individualized data representing content recognition or classification of the object of the subject is stored. In a case where the accumulation level is level (5), the reference address of the individualized data representing a trajectory of the object of the subject is stored.

Figure 19:
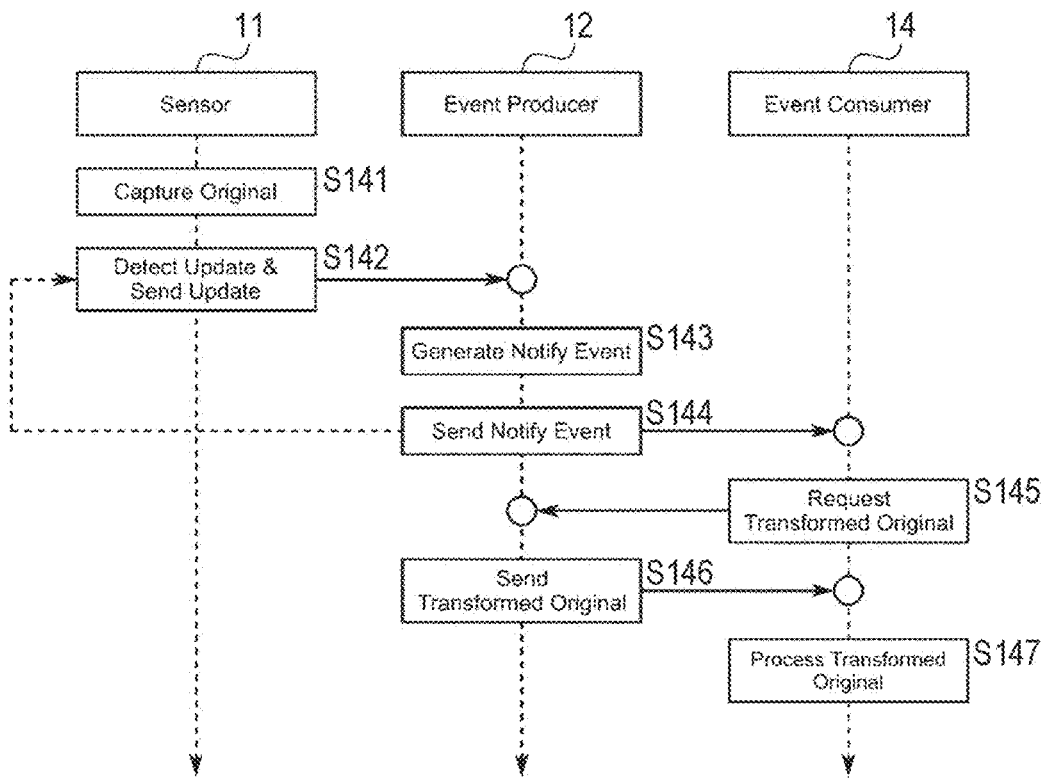
FIG. 19 is a flowchart for explaining sending control of event data and original data in a case of acquiring individualized data.

FIG. 19 is a flowchart for explaining sending control of event data and original data in a case where the event consumer 14 designates and acquires the individualized data from the event producer 12.

First, in step S141, the sensor 11 executes "Capture Original". That is, the sensor 11 acquires a luminance image $L^{n-1}(x, y)$ at a time $t^{n-1}$ as the original data.

In step S142, the sensor 11 executes "Detect Update & Send Update". That is, the sensor 11 detects a luminance image $L^n(x, y)$ at a time $t^n$, and notifies the event producer 12 of event data $e^n=\{x, y, p^n, t^n\}$ indicating a luminance change between the luminance image $L^{n-1}(x, y)$ at the time $t^{n-1}$ and the luminance image $L^n(x, y)$ at the time $t^n$, together with the luminance image $L^{n-1}(x, y)$ at the time $t^{n-1}$ which is the original data. The event producer 12 acquires the event data $e^n$ and the luminance image $L^{n-1}(x, y)$.

The event producer 12 executes "Generate Notify Event" in step S143, and executes "Send Notify Event" in step S144. Specifically, the event producer 12 generates and sends event data whose event type is Notify, to the event consumer 14. This event data is sent in the data format of FIG. 18.

The processing of steps S142 to S144 is repeatedly executed a plurality of times as necessary, in some cases.

In step S145, the event consumer 14 executes "Request Transformed Original". Specifically, the event consumer 14 requests the event producer 12 for individualized data by designating a reference address of the individualized data reference (Transformed Original Ref).

Upon receiving the request for the individualized data from the event consumer 14, the event producer 12 executes "Send Transformed Original" in step S146. Specifically, the event producer 12 sends the individualized data corresponding to the accumulation processing level to the event consumer 14.

In step S147, the event consumer 14 acquires the individualized data sent from the event producer 12, and executes "Process Transformed Original". That is, the event consumer 14 performs predetermined application processing using the acquired individualized data.

As described above, the event consumer 14 can acquire the individualized data itself to perform the application processing, or can acquire updated original data to perform the application processing similarly to the case where the event type is Update.

By sending after accumulating event data at a predetermined accumulation level through the accumulation processing, it is possible to further reduce network traffic and efficiently perform transfer processing on a large amount of data.

<8. Reservation and Assignment of Event Path>

Next, reservation and assignment of an event path will be described.

Figure 20:
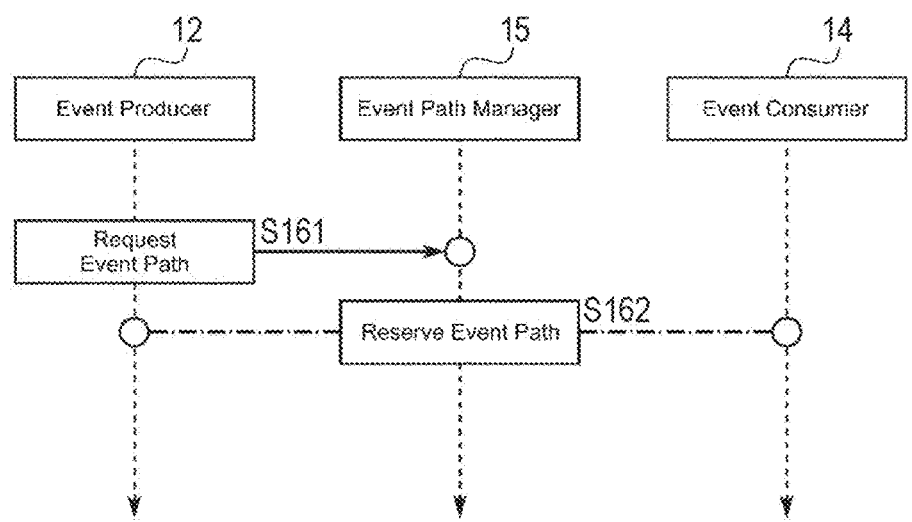
FIG. 20 is a flowchart for explaining event path reservation processing.

FIG. 20 is a flowchart of event path reservation processing performed by the event path manager 15.

In this processing, first, in step S161, the event producer 12 generates an event path request for requesting reservation of an event path, and sends the event path request to the event path manager 15 (Request Event Path).

The event path manager 15 receives the event path request from the event producer 12 in step S162, and reserves an event path between the event producer 12 and the event consumer 14 on the basis of the event path request.

Figure 21:
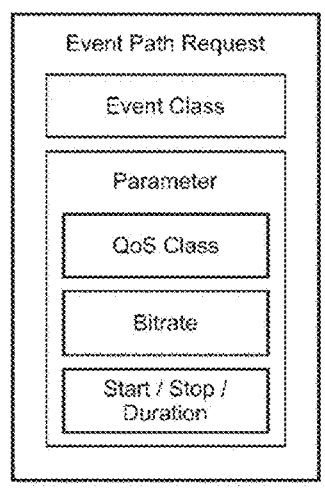
FIG. 21 is a diagram illustrating details of an event path request.

FIG. 21 illustrates details of the event path request sent from the event producer 12 to the event path manager 15.

The event path request stores an event class and a parameter.

For example, a class ID which is identification information for identifying a class (priority) is stored in the event class.

The parameter includes items indicating quality of data transfer, such as QoS Class, Bitrate, and Start/Stop/Duration. The QoS Class includes an ID for designating a (set) class of transport QoS such as a range of delays, maximum jitter, and a maximum error rate. The Bitrate includes a band bps, a guaranteed bit rate GBR (Guaranteed BitRate), and a maximum bit rate MBR (Maximum BitRate). The Start/Stop/Duration includes a start absolute time to use the path, an end absolute time (including designation of immediate use for immediately using after resources are assigned), a duration, and the like. By reserving network resources in advance by the event path request, it is possible to predict a maximum delay or the like before event data is transferred.

The event path manager 15 dynamically reserves network resources that can establish an event path that satisfies conditions indicated by the event path request, in the network between the event producer 12 and the event consumer 14.

Figure 22:
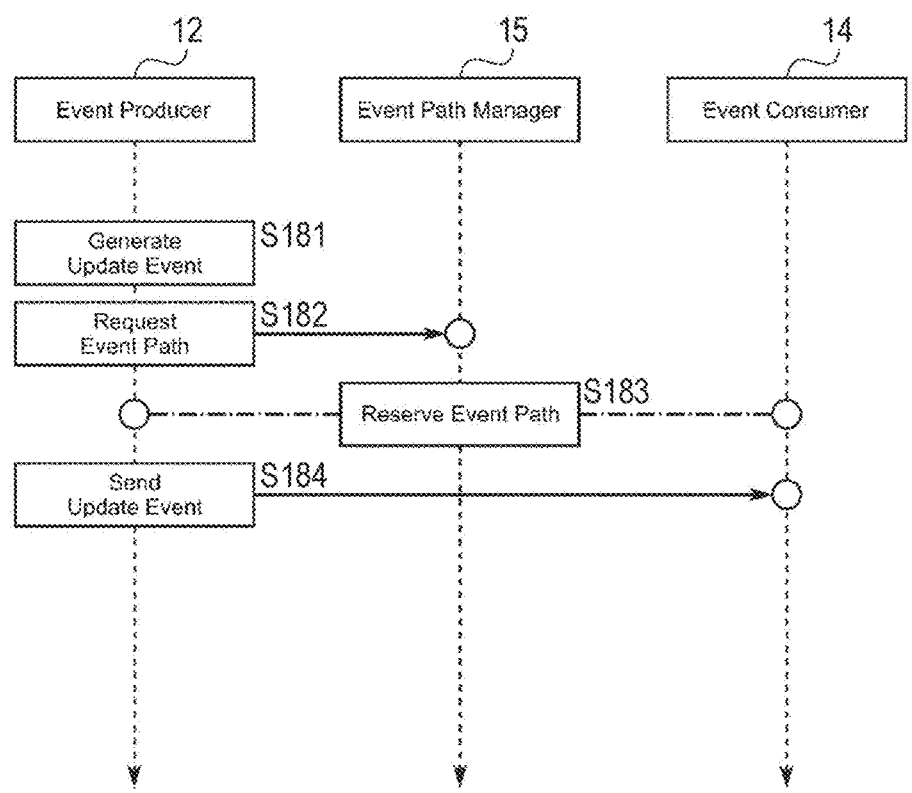
FIG. 22 is a flowchart for explaining the event path reservation processing.

FIG. 22 is a flowchart for explaining event path reservation processing including timings of reserving the event path illustrated in FIG. 20 and sending the event data in FIG. 7.

In the example of FIG. 22, after executing "Generate Update Event" in step S181, the event producer 12 sends an event path request for requesting reservation of an event path to the event path manager 15 in step S182 (Request Event Path). The processing in step S181 is the same as the processing in step S3 in FIG. 7, and the processing in step S182 is the same as the processing in step S161 in FIG. 20.

Then, in step S183, the event path manager 15 reserves an event path between the event producer 12 and the event consumer 14 on the basis of the event path request. After the event path is reserved, an ACK is sent together with a designated event class from the event path manager 15 to the event producer 12.

Upon receiving the ACK from the event path manager 15, the event producer 12 executes "Send Update Event" of sending event data to the event consumer 14 in step S184. In "Send Update Event", the event data may be sent with an event class added.

Note that, as described above, the event producer 12 may send the event data first instead of sending the event data after waiting for the ACK from the event path manager 15. In this case, when the event path manager 15 fails to reserve the event path, a NAK is returned from the event producer 12 for the event data.

The above-described processing in FIG. 22 is processing for reserving a necessary event path every time "Generate Update Event" occurs on the event producer 12 side.

Whereas, the event path manager 15 may reserve event paths collectively to some extent at all times before the event producer 12 executes a series of "Generate Update Event", and assign a necessary event path one after another from the event paths. In the case where the event paths are collectively reserved in advance, the event paths are reserved on the basis of a result of estimating network traffic between the event producer 12 and the event consumer 14, on the basis of past statistical data or the like of the sensor 11.

Figure 23:
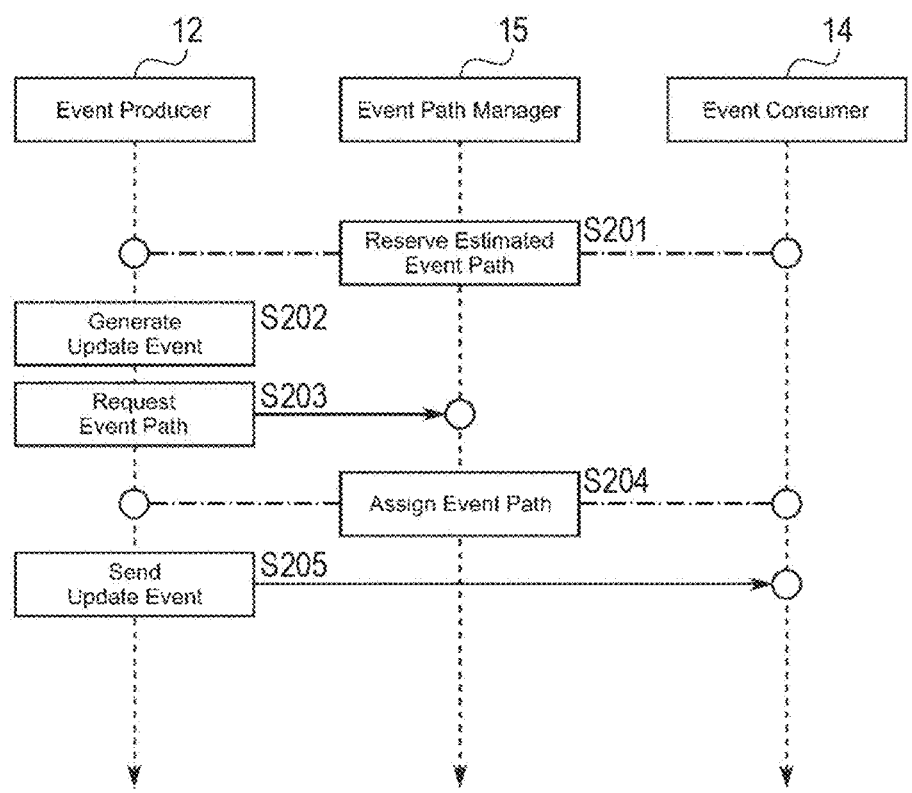
FIG. 23 is a flowchart for explaining the event path reservation processing.

FIG. 23 is a flowchart for explaining event path reservation processing in a case where an event path is assigned after being reserved in advance.

In the example of FIG. 23, in step S201, the event path manager 15 estimates network traffic between the event producer 12 and the event consumer 14, and reserves an event path between the event producer 12 and the event consumer 14.

The event producer 12 executes "Generate Update Event" in step S202, and thereafter sends an event path request to the event path manager 15 in step S203.

In step S204, the event path manager 15 reserves an event path between the event producer 12 and the event consumer 14 from the event paths reserved in advance, and sends an ACK together with the designated event class to the event producer 12.

In step S205, the event producer 12 receives the ACK from the event path manager 15, and executes "Send Update Event" to send event data to the event consumer 14.

As described above, in a case where event paths are reserved in advance and an event path is assigned from among them, it is possible to reduce overhead one after another in establishing network resources that can occur in reservation.

<Modification of Event Path Request>

Figure 24:
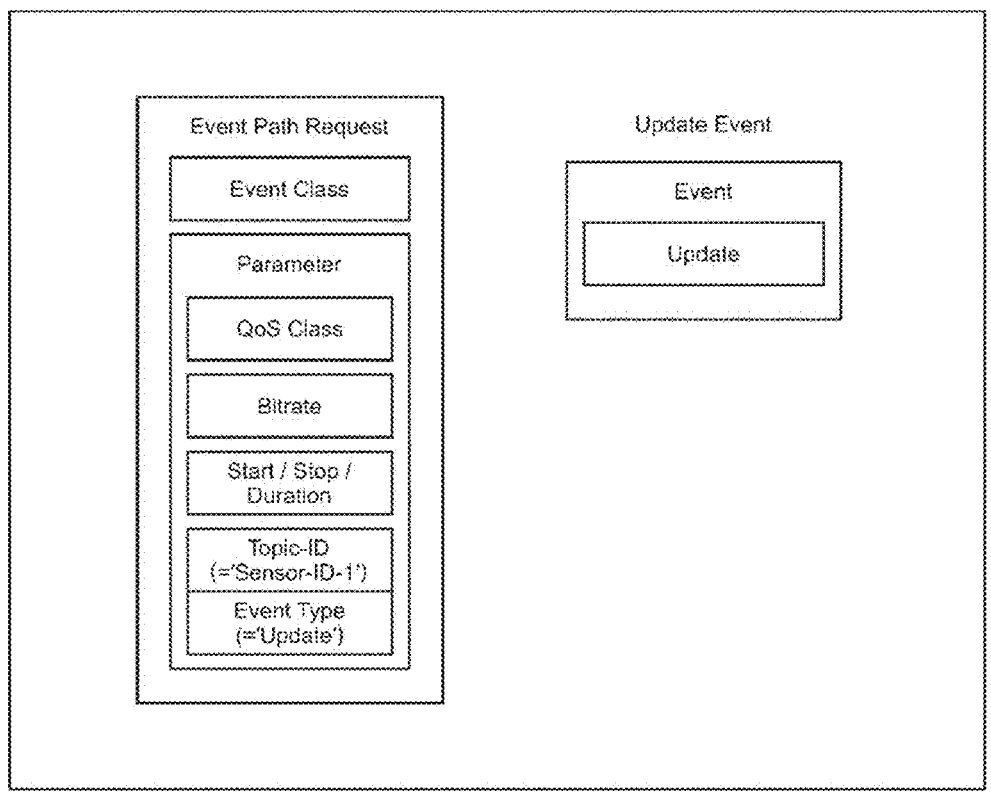
FIG. 24 is a diagram illustrating a modification of the event path request.

When sending the event path request to the event path manager 15 in step S182 of FIG. 22 or step S203 of FIG. 23, the event producer 12 may send the event path request in a format illustrated on a left side of FIG. 24.

The event path request illustrated on the left side of FIG. 24 shows a modification of the event path request illustrated in FIG. 21.

Comparing the event path request of FIG. 24 with the event path request of FIG. 21, a topic ID and an event type are added. Upon receiving the event path request of FIG. 24, the event path manager 15 shares the topic ID and the event type with the event consumer 14 when reserving the event path between the event producer 12 and the event consumer 14. As a result, when the event producer 12 executes "Send Update Event" to send event data to the event consumer 14, as illustrated on a right side of FIG. 24, it is sufficient to store and send only update data (event data e), and a data amount of individual event data can be minimized.

<Transport Stack Constituting Event Path>

Next, a transport stack configuration constituting an event path will be described.

Figure 25:
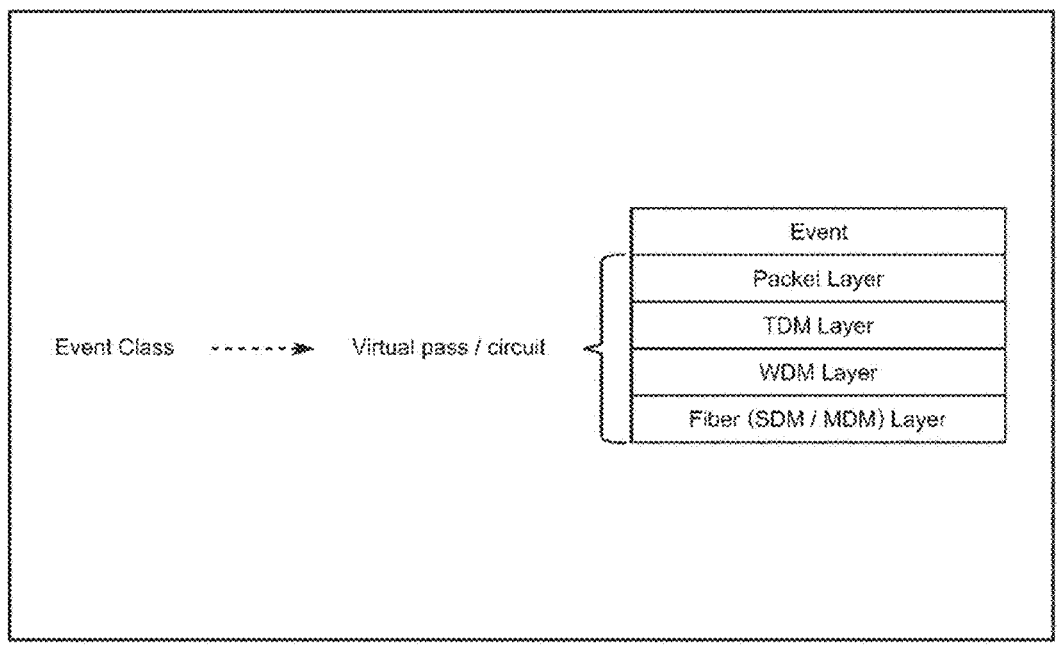
FIG. 25 is a diagram for explaining a transport stack configuration constituting an event path.

A stack configuration when event data is transferred through an event path of a user plane on an optical network system is as illustrated in FIG. 25.

A transport stack includes, from a lowermost layer side, Fiber Layer (space division multiplexing (SDM) or mode division multiplexing (MDM) in one fiber), wavelength division multiplexing (WDM) of WDM layer, and time division multiplexing (TDM) of TDM layer in this order, and further includes, on top of that, an IP packet layer or a non-IP layer as a transport of an upper layer.

The event path is basically established in connection oriented. That is, at a time of connection setup, a virtual path is formed between a sending side and a reception side by a generalized multi-protocol label switch (GMPLS) (network resources are reserved). In the example described above, the event producer 12 serves as the sending side, and the event consumer 14 serves as the reception side. A virtual path that satisfies each requirement is reserved in association with an event class (a distribution requirement such as priority) of the event path request sent by the sending side. For reserving the virtual path, resource reservation protocol (RSVP)-traffic engineering (TE) extension or the like for the GMPLS exchanged on a control plane is used.

Note that FIG. 25 illustrates an example of the stack configuration on the optical network system, but the event path is formed by reserving a virtual path that satisfies a predetermined transfer requirement even in a case where the stack configuration on a wireless network system is adopted.

<9. Negotiation of Event Class>

While reserving or assigning an event path, in a case where the event path manager 15 cannot reserve an event path that satisfies a requirement designated in an event path request from the event producer 12, which is the sending side, or in a case where a state in which the event path is unavailable to be reserved continues, the event path manager 15 performs negotiation for adjusting an event class with the event consumer 14.

Figure 26:
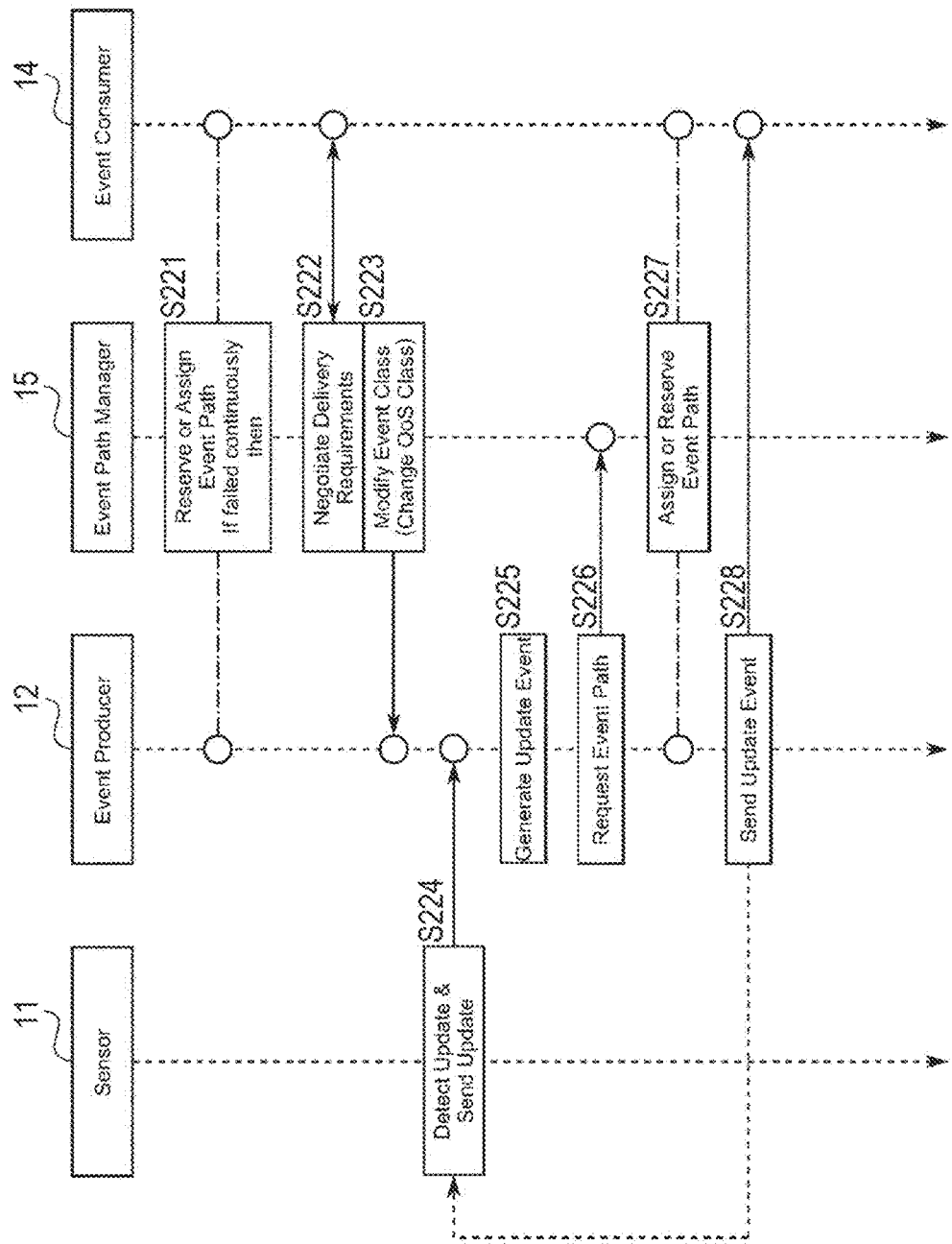
FIG. 26 is a flowchart of event data sending control including negotiation of an event class.

FIG. 26 illustrates a flowchart of event data sending control including negotiation of an event class.

In step S221, the event path manager 15 performs a process of reserving or assigning an event path, and determines whether or not an event path satisfying a requirement designated in an event path request is unavailable to be reserved, or whether or not such a state continues.

In a case where it is determined in step S221 that the event path is unavailable to be reserved or such a state continues, the processing proceeds to step S222, and the event path manager 15 performs negotiation of negotiating (requesting) an event class change with the event consumer 14, such as, for example, whether a value of QoS Class of a parameter of the event path request is allowed to be changed (Negotiate Delivery Requirements).

When consent that the value of QoS Class is allowed to be changed is obtained in the negotiation with the event consumer 14 in step S222, in step S223, the event path manager 15 relaxes a delay constraint, and sends an event class change instruction (Change Qos Class) for changing the value of QoS Class to the event producer 12 (Modify Event Class).

The negotiation of the event path manager 15 with the event consumer 14 may be performed one after another when the event class needs to be changed in some cases, or may be automatically determined when an adaptation requirement is learned to some extent in some cases. Whether to require negotiation of the event path manager 15 one after another or causes automatic determination can be designated by the event consumer 14 side prior to or during transfer of the event data.

A series of processing in steps S224 to S228 is the same as the above-described step S2 in FIG. 7, steps S181 to S184 in FIG. 22, or steps S202 to S205 in FIG. 23, and thus a description thereof is omitted.

Furthermore, for example, in a case where an event path that satisfies the requirement designated by the event path request is unavailable to be reserved, or in a case where such a state continues, a frequency of outputting event data may be reduced by changing a parameter of the sensor 11.

Figure 27:
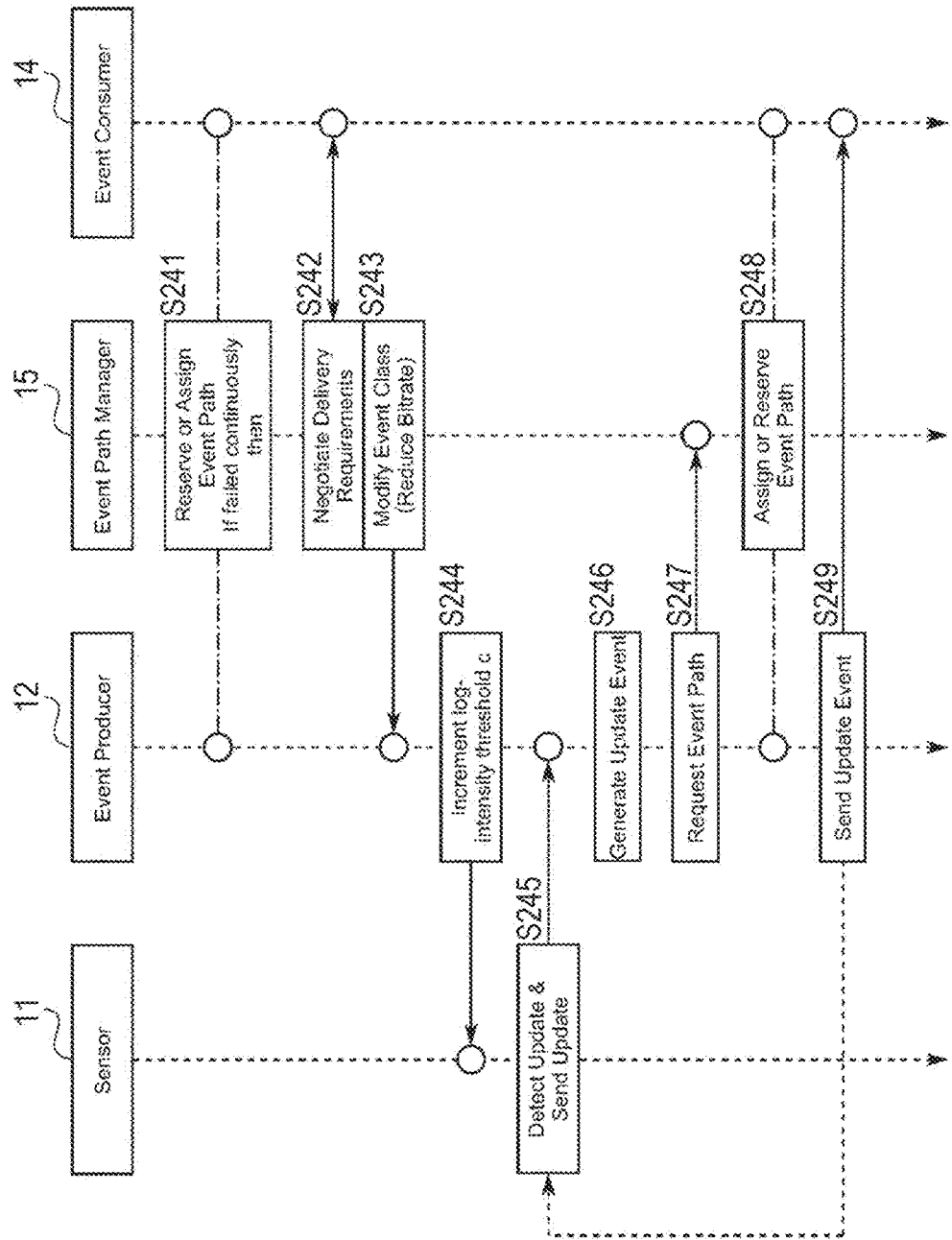
FIG. 27 is a flowchart of event data sending control including negotiation for changing a parameter.

FIG. 27 illustrates a flowchart of event data sending control including negotiation for changing a parameter of the sensor 11.

In step S241, the event path manager 15 performs a process of reserving or assigning an event path, and determines whether or not an event path satisfying a requirement designated in an event path request is unavailable to be reserved, or whether or not such a state continues.

In a case where it is determined in step S241 that the event path is unavailable to be reserved or such a state continues, the processing proceeds to step S242, and the event path manager 15 performs negotiation of negotiating (requesting) with the event consumer 14 whether a parameter of the sensor 11, for example, the threshold value c for a logarithmic luminance change is allowed to be changed (Negotiate Delivery Requirements).

In the negotiation with the event consumer 14 in step S242, when consent is obtained that the threshold value c of the logarithmic luminance change is allowed to be changed, in step S243, the event path manager 15 sends an instruction to decrease a bit rate (Reduce Bitrate) to the event producer 12 (Modify Event Class).

When receiving the instruction to decrease the bit rate, the event producer 12 notifies the sensor 11 of an instruction to increment the threshold value c of the logarithmic luminance change (Increment log-intensity threshold value c) in step S244.

When the sensor 11 acquires the instruction to increment the threshold value c of the logarithmic luminance change from the event producer 12, the sensor 11 makes a change to increment the threshold value c of the logarithmic luminance change. As a result, an occurrence frequency of events detected in the processing of steps S245 to S249 decreases. The processing in steps S245 to S249 is the same as that in step S2 in FIG. 7 described above, steps S181 to S184 in FIG. 22, or steps S202 to S205 in FIG. 23, and thus a description thereof will be omitted.

Conversely, the event path manager 15 may increase a frequency of outputting event data in a case where improvement of network traffic is found.

Figure 28:
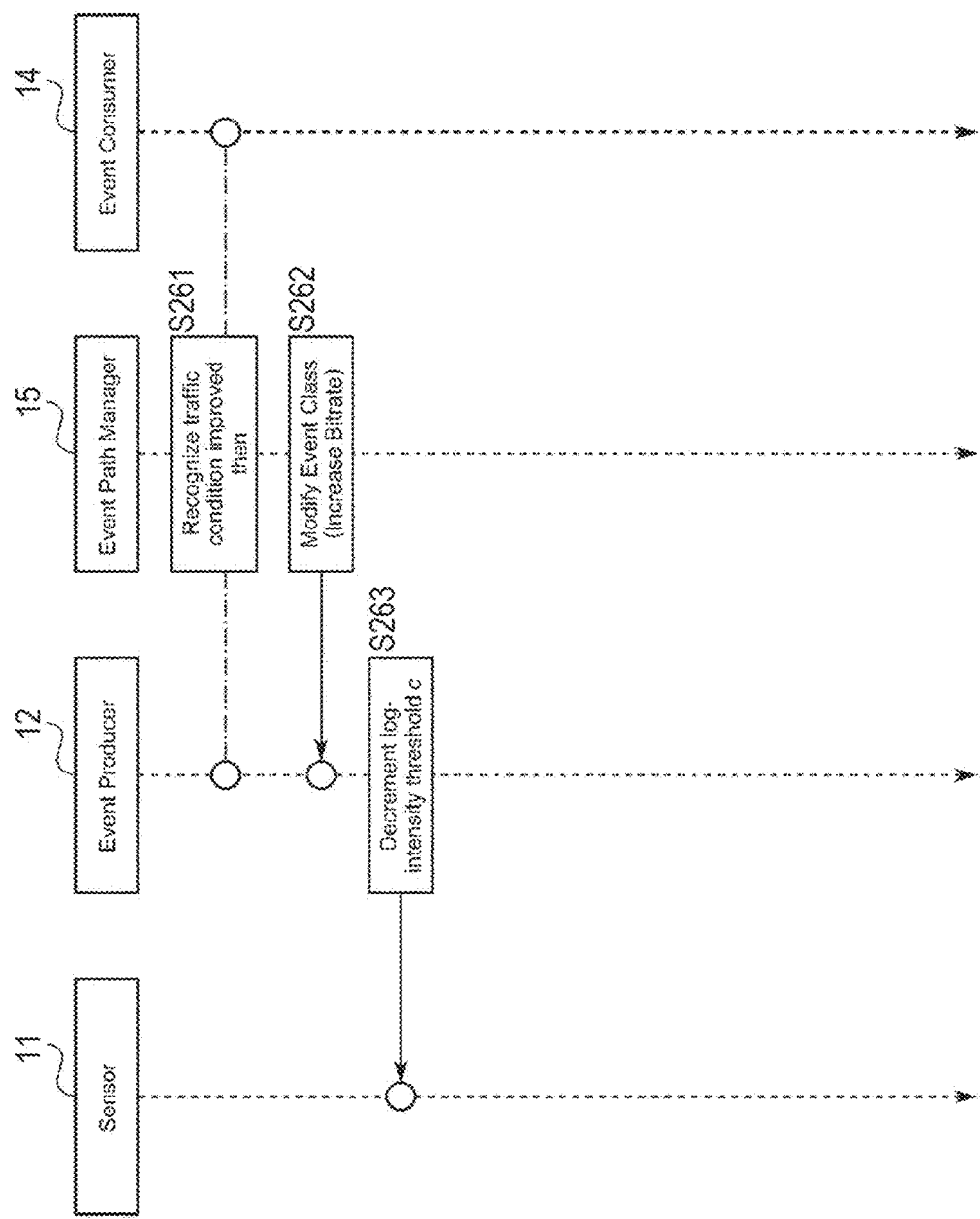
FIG. 28 is a flowchart of event data sending control including negotiation for changing a parameter.

FIG. 28 illustrates a flowchart of event data sending control including negotiation for changing a parameter of the sensor 11 in a direction of improving a bit rate.

In step S261, the event path manager 15 determines whether or not network traffic has been improved.

In a case where it is determined that network traffic has been improved in step S261, the processing proceeds to step S262, and the event path manager 15 sends a parameter for the sensor 11 for increasing a bit rate (Increase Bitrate), for example, to the event producer 12 (Modify Event Class).

When receiving the instruction to increase the bit rate, the event producer 12 notifies the sensor 11 of an instruction to decrement the threshold value c of the logarithmic luminance change (Decrement log-intensity threshold value c) in step S263.

As a result, a detection sensitivity increases, and the event class is changed so as to satisfy the initial requirement designated in the event path request. After step S263, the same processing as steps S245 to S249 in FIG. 27 is executed, and detection of the event with use of the changed threshold value c of the logarithmic luminance change and sending of the event data are executed.

<10. Second Embodiment of Data Processing System>

In the data processing system 1 of the first embodiment, a mode has been adopted in which the event producer 12 and the event consumer 14 are configured by Peer to Peer (P2P) connection.

However, a case is also assumed in which there are a large number of event consumers 14 and sensor data generated by the sensor 11 is transferred to the large number (plurality) of event consumers 14. In a second embodiment, a configuration of a data processing system 1 in such a case will be described. Note that, in the second embodiment, it is not always necessary to provide a plurality of event consumers 14, and it is needless to say that a case where there is one event consumer 14 is also included.

Figure 29:
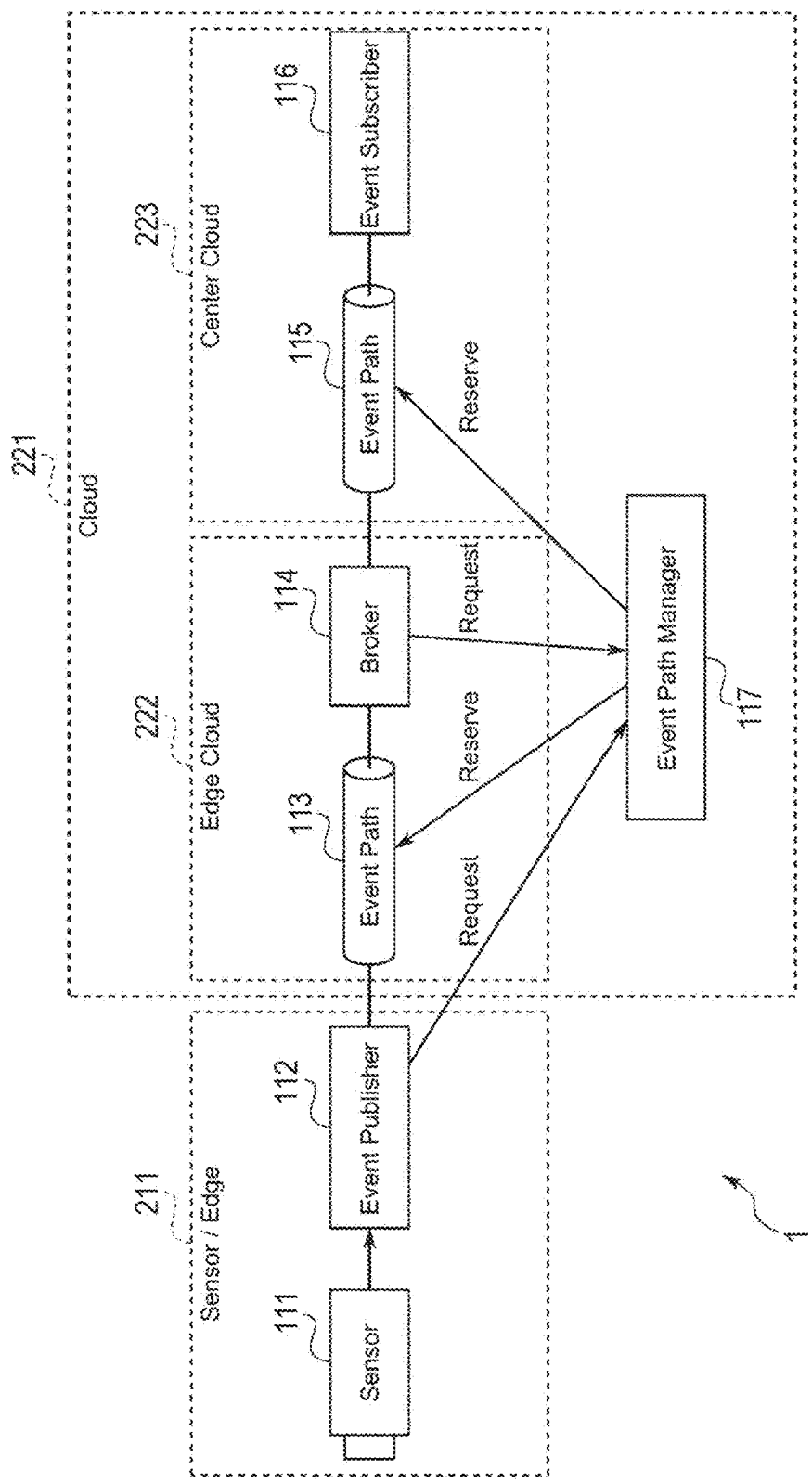
FIG. 29 is a block diagram illustrating a configuration example of a second embodiment of a data processing system to which the present disclosure is applied.

FIG. 29 is a block diagram illustrating a configuration example of the second embodiment of a data processing system to which the present disclosure is applied.

In order to reduce an application execution load of a sensor device, the data processing system of the second embodiment introduces a broker that mediates data distribution in a cloud, and constitutes a distribution system with a publish/subscribe model.

Here, the publish/subscribe model is a type of asynchronous messaging paradigm, and is programed such that a sender (a publisher side) of a message sends a message without assuming a specific receiver (subscriber). The published message is published by being divided into topics. The publisher has no knowledge regarding the subscriber. The subscriber side designates a topic of interest and receives only messages belonging to the topic. The subscriber has no knowledge of the publisher. The publish/subscribe model basically has a low degree of coupling between the publisher side and the subscriber side, and thus has good scalability and can cope with a dynamic network configuration.

In the second embodiment, a data distributor corresponding to the event producer in the first embodiment is referred to as an event publisher, and a data user corresponding to the event consumer in the first embodiment is referred to as an event subscriber.

The data processing system 1 of FIG. 29 includes a sensor 111, an event publisher 112, a broker 114, an event subscriber 116, and an event path manager 117. The event publisher 112 and the broker 114 are connected by an event path 113, and the broker 114 and the event subscriber 116 are connected by an event path 115.

Note that, although not illustrated, the data processing system 1 in FIG. 29 also includes a topic manager 16 and a topic DB 17 similarly to the first embodiment.

The sensor 111 may be implemented by a sensor device alone, or may be integrally incorporated as part of an edge device on which the event publisher 112 connected to the sensor device is executed. The edge device is implemented by, for example, a data processing device such as a server device. Hereinafter, the sensor 111 and the event publisher 112 are collectively referred to as a sensor/edge 211.

A cloud 221 includes a plurality of nodes and a network connecting the nodes. The network includes a communication network or a communication path of any communication standard such as, for example, the Internet, a public telephone network, a wide-area communication network for a wireless mobile body such as a so-called 4G line or 5G line, a wide area network (WAN), a local area network (LAN), a wireless communication network that performs communication conforming to the Bluetooth (registered trademark) standard, a communication path for short-range wireless communication such as near field communication (NFC), a communication path for infrared communication, or a communication network of wired communication conforming to a standard such as high-definition multimedia interface (HDMI (registered trademark)) or universal serial bus (USB). Each node constituting the cloud 221 includes, for example, a network connection device such as a sensor device, a router, a modem, a hub, a bridge, a switching hub, a base station control device, a switch, or a server. An application to be executed on the network connection device as a node functions as the broker 114, the event subscriber 116, the event path manager 117, the topic manager 16, or the topic DB 17.

The cloud 221 includes an edge cloud 222 arranged on an edge side close to the sensor/edge 211 that injects sensor data into a network, and a center cloud 223 arranged in a core network other than that. The edge cloud 222 includes, for example, a base station and the like in a case where the network is a mobile phone communication network.

The sensor 111 and the event publisher 112 correspond to the sensor 11 and the event producer 12 in the first embodiment. The sensor 111 is a sensor device that detects a state of some kind, and supplies generated original data to the event publisher 112. The event publisher 112 is an application that obtains original data from the sensor 111 and sends the original data and event data to the broker 114 via the event path 113. The event publisher 112 and the broker 114 are connected in a one-to-one relationship.

The event publisher 112 transfers all acquired event data to the broker 114, and the broker 114 handles a request from the event subscriber 116 and sends the event data. Furthermore, not only the sending of the event data, the original data is also similarly transferred from the event publisher 112 to the broker 114, and the broker 114 handles a request from the event subscriber 116. The broker 114 is located in the edge cloud 222 and the event subscriber 116 is located in the center cloud 223.

The broker 114 sends the original data or the event data sent from the event publisher 112 via the event path 113, to the event subscriber 116 via the event path 115. The broker 114 and the event subscriber 116 are connected in a one-to-many (plural) relationship.

Similarly to the topic registration processing ("Register Topic") in which the event consumer 14 notifies the event producer 12 of a necessary topic ID in the first embodiment, the broker 114 acquires and grasps a topic ID of interest to the event subscriber 116 in advance through the topic registration processing ("Register Subscription") performed by the event subscriber 116. Then, in a case where the event data of interest to the event subscriber 116 is sent from the event publisher 112, the broker 114 appropriately reserves the event path 115 and transfers to the event subscriber 116.

The event path manager 117 is arranged in either the edge cloud 222 or the center cloud 223, and reserves and secures an event path similarly to the event path manager 15 of the first embodiment. Reservation and assignment of the event path 113 between the event publisher 112 and the broker 114 and of the event path 115 between the broker 114 and the event subscriber 116 are performed individually. The event path 113 between the event publisher 112 and the broker 114 is reserved in response to a request from the event publisher 112, and the event path 115 between the broker 114 and the event subscriber 116 is reserved in response to a request from the broker 114.

<11. Sending Control of Event Data and Original Data>

Figure 30:
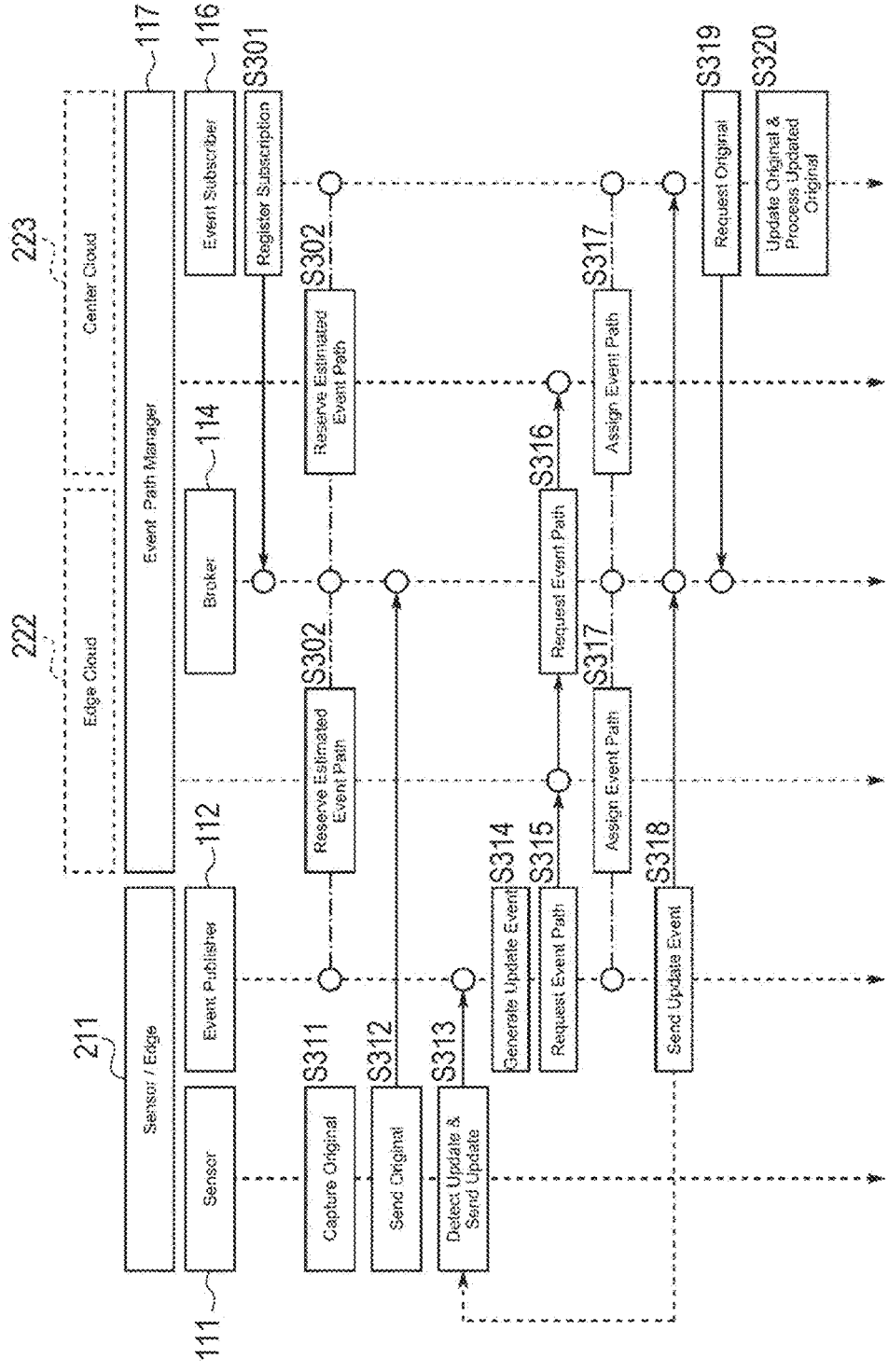
FIG. 30 is a flowchart for explaining sending control of event data and original data by the data processing system in FIG. 29.

Next, with reference to a flowchart of FIG. 30, sending control of event data and original data by the data processing system 1 of FIG. 29 will be described.

First, in step S301, the event subscriber 116 executes topic registration processing ("Register Subscription") of notifying the broker 114 of a necessary topic ID. The broker 114 receives the topic ID notified from the event subscriber 116.

In step S302, the event path manager 117 reserves the event paths 113 and 115. That is, the event path manager 117 estimates network traffic between the event publisher 112 and the broker 114, and reserves the event path 113 between the event publisher 112 and the broker 114. Furthermore, the event path manager 117 estimates network traffic between the broker 114 and the event subscriber 116, and reserves the event path 115 between the broker 114 and the event subscriber 116.

The sensor 111 executes "Capture Original" in step S311, and executes "Send Original" in step S312. That is, the sensor 111 acquires a luminance image $L^{n-1}(x, y)$ at a time $t^{n-1}$ as original data, and sends to the broker 114. The broker 114 receives the luminance image $L^{n-1}(x, y)$ from the sensor 111, and stores in an internal storage unit. The luminance image $L^{n-1}(x, y)$ may be sent to the broker 114 via the event publisher 112.

In step S313, the sensor 111 executes "Detect Update & Send Update". Specifically, the sensor 111 detects a luminance image $L^n(x, y)$ at a time $t^n$, and supplies event data $e^n=\{x, y, p^n, t^n\}$ indicating a luminance change between the luminance image $L^{n-1}(x, y)$ at the time $t^{n-1}$ and the luminance image $L^n(x, y)$ at the time $t^n$, to the event publisher 112. The event publisher 112 obtains the event data $e^n$.

In step S314, the event publisher 112 executes "Generate Update Event" for generating event data. Subsequently, in step S315, the event publisher 112 executes "Request Event Path", and sends an event path reservation request to the event path manager 117 and the broker 114. The broker 114 also executes "Request Event Path", and sends the event path reservation request to the event path manager 117.

In step S317, the event path manager 117 individually assigns the event path 113 between the event publisher 112 and the broker 114 and the event path 115 between the broker 114 and the event subscriber 116, from among event paths reserved in advance.

When the assignment of the event path 113 and the event path 115 is completed, the event publisher 112 executes "Send Update Event" in step S318. Specifically, the event publisher 112 sends the event data generated in step S314 to the broker 114 via the event path 113. The broker 114 receives the event data from the event publisher 112, and sends to a large number of event subscribers 116 via the event path 115.

The processing of steps S313 to S318 is repeatedly executed a plurality of times as necessary, in some cases.

In step S319, the event subscriber 116 executes "Request Original". Specifically, the event subscriber 116 requests the broker 114 for the original data by designating an original reference (Original Ref) included in the event data $e^n$. The broker 114 executes "Send Original" on the basis of "Request Original" from the event subscriber 116, and sends the luminance image $L^{n-1}(x, y)$ at the time $t^{n-1}$ as the original data to the event subscriber 116.

In step S320, each of the large number of event subscribers 116 acquires the luminance image $L^{n-1}(x, y)$ at the time $t^{n-1}$ as the original data sent from the broker 114, and executes "Update Original & Process Updated Original". That is, the event subscriber 116 executes a process of recovering the luminance image $L^n(x, y)$ at the time $t^n$, and executes predetermined application processing using the updated luminance image $L^n(x, y)$.

As described above, in a case where sensor data is distributed to a large number of event subscribers 116, the event publisher 112 sends the original data and the event data to the broker 114, and the broker 114 distributes the original data and the event data in response to requests from the large number of event subscribers 116. This configuration can reduce an execution load of the sensor/edge 211 application.

<12. Negotiation of Event Class>

Event classes that are set in each of the event path 113 between the event publisher 112 and the broker 114 and the event path 115 between the broker 114 and the event subscriber 116 are basically the same. However, the event class is changed in accordance with a traffic situation between the individual broker 114 and the event subscriber 116, in some cases.

Figure 31:
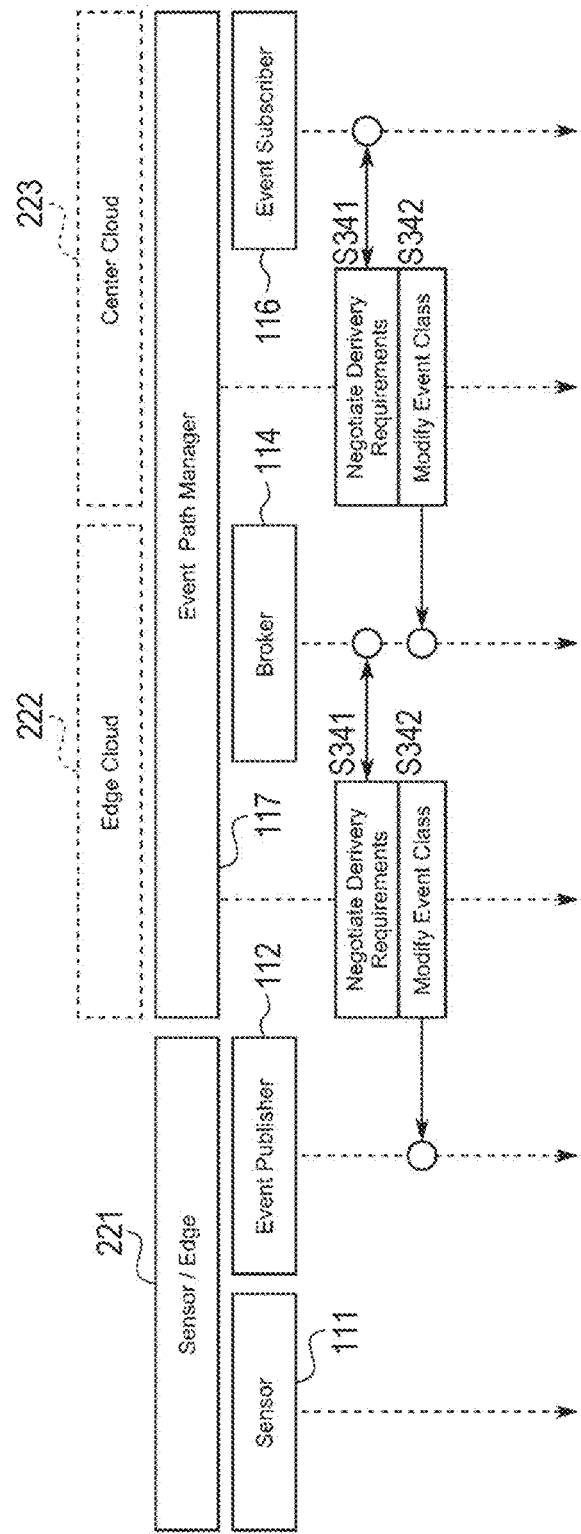
FIG. 31 is a flowchart of event class change control for performing negotiation of an event class.

FIG. 31 illustrates a flowchart of event class change control in which the event path manager 117 performs negotiation of an event class.

In step S341, in a case where it is determined that an event path satisfying a requirement designated in an event path request is unavailable to be reserved or such a state continues, the event path manager 117 individually performs negotiation of negotiating (requesting) for an event class change with the broker 114 or the event subscriber 116 (Negotiate Delivery Requirements). That is, the event path manager 117 negotiates with the broker 114 for the event path 113 and negotiates with the event subscriber 116 for the event path 115.

As a result of the negotiation in step S341, when consent for the event class change is obtained, the event path manager 117 sends an event class change instruction to the event publisher 112 or the broker 114 (Modify Event Class) in step S342. In other words, the event class change instruction is sent to the event publisher 112 for the event class change of the event path 113, and the event class change instruction is sent to the broker 114 for the event class change of the event path 115.

Here, a bit rate is adjusted such that a bit rate of the event path 113 between the event publisher 112 and the broker 114 is greater than a maximum value of a bit rate of (a plurality of pieces of) the event path 115 between the broker 114 and the event subscriber 116. That is, adjustment is performed such that a requirement between the event publisher 112 and the broker 114 is severer than a requirement between the broker 114 and the plurality of event subscribers 116.

Figure 32:
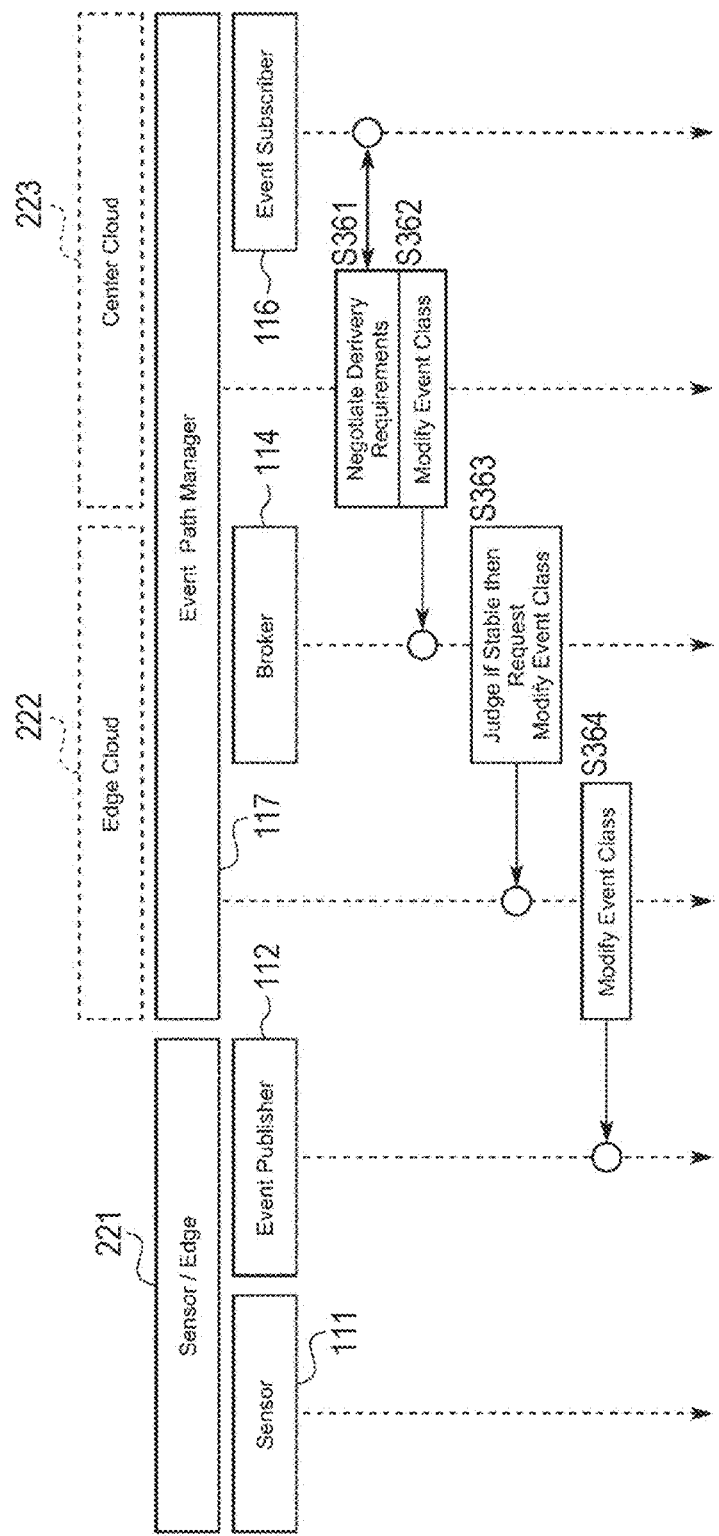
FIG. 32 is a flowchart of the event class change control.

FIG. 32 illustrates a flowchart of the event class change control in a case where entire optimization is achieved by reflecting an event class of the event path 115 in an event class of the event path 113.

By reflecting the event class negotiated between the broker 114 and the plurality of event subscribers 116 in the event class between the event publisher 112 and the broker 114, overall optimization can be achieved in some cases.

Specifically, in step S361, in a case where it is determined that a requirement designated in an event path request in the event path 115 cannot be satisfied or such a state continues, the event path manager 117 performs negotiation of negotiating (requesting) for an event class change with the event subscriber 116 (Negotiate Delivery Requirements).

As a result of the negotiation in step S361, when consent for the event class change is obtained, the event path manager 117 sends an event class change instruction, for example, for lowering a bit rate to the broker 114 (Modify Event Class) in step S362.

In step S363, the broker 114 determines whether or not a maximum value of bit rates of the plurality of event paths 115 between the broker 114 and the event subscribers 116 has been stabilized to a predetermined value (judge if stable). In a case where the broker 114 determines that the bit rate is stable, the broker 114 sends an event class change instruction for decreasing a bit rate corresponding to the maximum value of the bit rate, to the event path manager 117 (Modify Event Class).

In step S364, the event path manager 117 sends the event class change instruction to the event publisher 112 on the basis of the event class change instruction from the broker 114 (Modify Event Class).

For example, in a case where a bit rate between the broker 114 and the plurality of event subscribers 116 is stable at 5 Mbps, 4 Mbps, and 2 Mbps, it is possible to minimize overall traffic by changing a bit rate between the event publisher 112 and the broker 114, which has been 10 Mbps, to 6 Mbps. That is, by changing an event class while maintaining a requirement between the event publisher 112 and the broker 114 to be slightly severer than a requirement between the broker 114 and the plurality of event subscribers 116, unnecessary network resource consumption can be lowered.

<13. Immediate Transfer and Delayed Transfer>

In the control example described above, an example has been described in which one event publisher 112 distributes event data to a plurality of event subscribers 116 via one broker 114.

However, there is a case where the broker 114 acquires event data having different topic IDs from a plurality of event publishers 112 (for example, in a case where one sensor 111 has one topic ID, or the like), and there is a case where the broker 114 acquires event data with multiple different topic IDs from one event publisher 112 (for example, a case where a topic ID corresponding to a plurality of object regions ROI is included in an image of one sensor 111, or the like).

Event data of a different topic ID acquired by the broker 114 has different priority (an event class). Thus, in a case where there is no margin in the event path 115 between the broker 114 and each of the event subscribers 116 and resource scramble occurs, the broker 114 appropriately selects and executes immediate transfer in which event data is immediately transferred and delayed transfer (cache transfer) in which event data is temporarily cached and then transferred, according to each priority.

Figure 33:
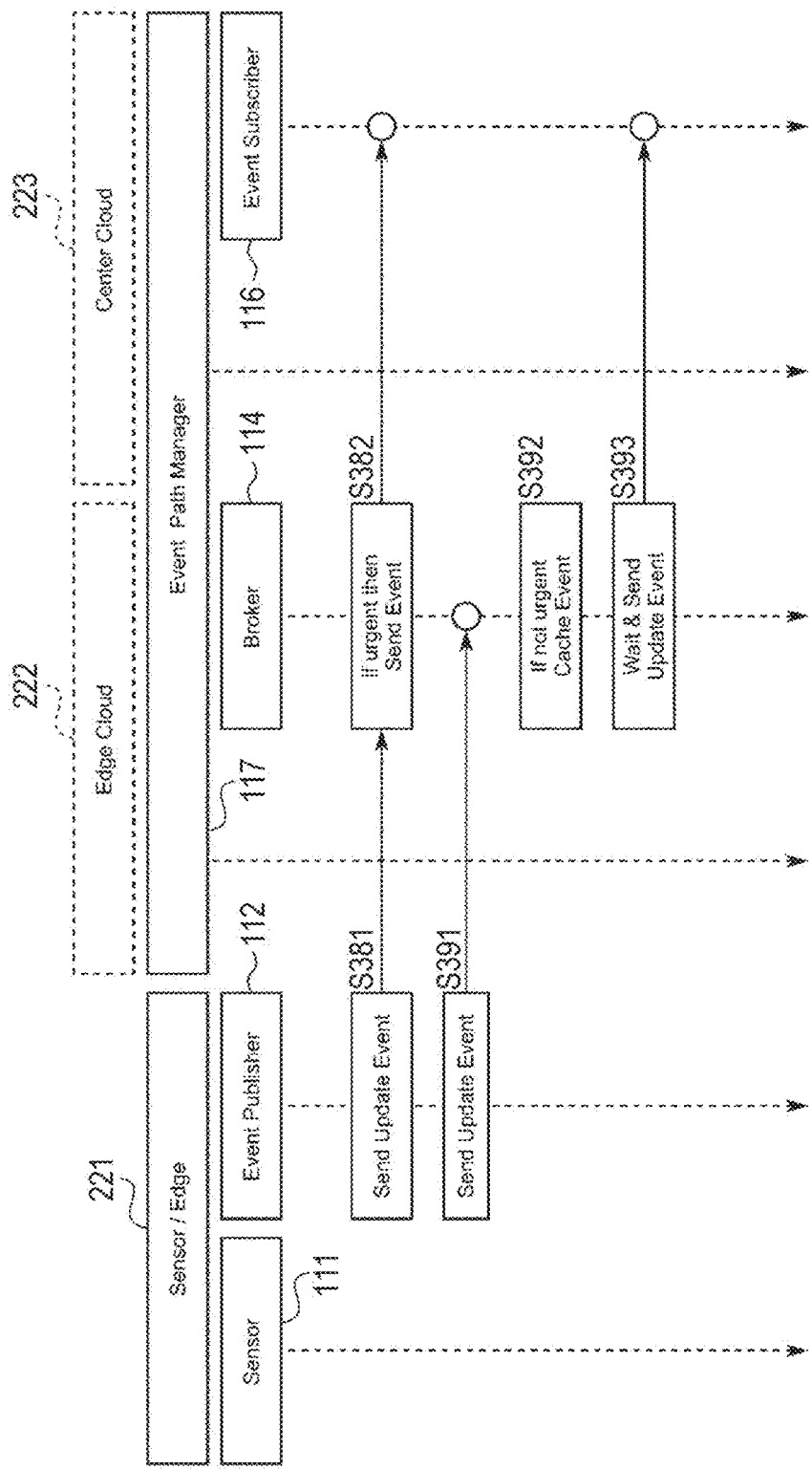
FIG. 33 is a flowchart illustrating a control example of immediate transfer and delayed transfer.

FIG. 33 is a flowchart illustrating a control example of the immediate transfer and the delayed transfer.

Steps S381 and S382 in FIG. 33 are a control example in a case where the immediate transfer is performed.

Specifically, in step S381, the event publisher 112 executes "Send Update Event", to send event data to the broker 114.

In step S382, the broker 114 receives the event data from the event publisher 112, and determines an event class of the event data. Then, in a case where the event class of the received event data is an event class with a severe delay requirement or the like, in other words, an event class with high priority, the broker 114 immediately sends the event data to the event subscriber 116.

Steps S391 to S393 in FIG. 33 are a control example in a case where the delayed transfer is performed.

Specifically, in step S391, the event publisher 112 executes "Send Update Event", to send event data to the broker 114.

In step S392, the broker 114 receives the event data from the event publisher 112, and determines an event class of the event data. Then, in a case where the event class of the received event data is an event class with a lax delay requirement or the like, in other words, an event class with low priority, the event data is temporarily stored (cached) in an internal storage unit.

Then, in step S393, after waiting for a certain period of time, the broker 114 sends the temporarily stored event data to the event subscriber 116.

As described above, the broker 114 can appropriately select and execute the immediate transfer and the delayed transfer of the received event data, on the basis of the priority indicated by the event class. Network and calculation resources can be preferentially assigned to the event data having high urgency, or the event data with low priority can be cached.

<14. Configuration Example of Cloud Computing>

The method and the system described in this specification, including the data processing system and the network control method described above, can be implemented using computer programming or engineering techniques, including computer software, firmware, hardware, or a combination or subset thereof.

FIG. 34 illustrates a block diagram of a computer in which various embodiments described in this specification can be implemented.

The present disclosure can be implemented as a system, a method, and/or a computer program. The computer program may include a computer-readable storage medium, and computer-readable program instructions that cause one or more processors to execute aspects of the embodiments are recorded on the computer-readable storage medium.

The computer-readable storage medium can be a tangible device that can store instructions for use in an instruction execution device (a processor). The computer-readable storage medium may be, for example, but not limited to, an electronic storage device, a magnetic storage device, an optical storage device, an electromagnetic storage device, a semiconductor storage device, or any suitable combination of those devices. More specific examples of the computer-readable storage medium include each (and suitable combinations) of the following: a flexible disk, a hard disk, a solid state drive (SSD), a random access memory (RAM), a read only memory (ROM), an erasable and programmable read only memory (EPROM) or a flash memory (Flash), a static random access memory (SRAM), a compact disk (CD or CD-ROM), a digital versatile disc (DVD), and a card type or a stick type memory. The computer-readable storage medium as used in the present disclosure is not to be construed as being a transitory signal itself, such as a radio wave or other freely propagating electromagnetic wave, an electromagnetic wave propagating through a waveguide or other transmission medium (for example, a light pulse through an optical fiber cable), or an electrical signal sent over a wire.

Computer-readable program instructions of the present disclosure may be downloaded from the computer-readable storage medium to a suitable computing or processing device, or may be downloaded to an external computer or external storage, for example, via a global network such as the Internet, a local area network, a wide area network, and/or a wireless network. The network includes a copper transmission line, an optical communication fiber, wireless transmission, a router, a firewall, a switch, a gateway computer, an edge server, and/or the like. A network adapter card or a network interface in a computing device or a processing device can receive the computer-readable program instructions from the network, and transfer and store the computer-readable program instructions on the computer-readable storage medium in the computing device or the processing device.

The computer-readable program instructions for executing the processes of the present disclosure include machine language instructions and/or microcode, and these are compiled or interpreted from source code written in any combination of one or more grogram languages, including an assembly language, Basic, Fortran, Java, Python, R, C, C++, C#, or similar programming languages. The computer-readable program instructions can be executed completely on a user's personal computer, notebook computer, tablet, or smartphone, and can also be executed completely on a remote computer or computer server, or any combination of these computing devices. The remote computer or computer server may be connected to a user's device or a device via a computer network, such as a local area network, a wide area network, or a global network (for example, the Internet). In order to implement aspects of the present disclosure, there is also an embodiment in which, for example, an electric circuit including a programmable logic circuit, a field-programmable gate array (FPGA), and a programmable logic array (PLA) uses information from computer-readable program instructions for configuring or customizing the electronic circuit, and execute the computer-readable program instructions.

Aspects of the present disclosure are described in this specification with reference to flowcharts and block diagrams of a method, a device (a system), and a computer program according to an embodiment of the disclosure. It will be understood by those skilled in the art that each block of the flowcharts and the block diagrams, and combinations of blocks in the flowcharts and the block diagrams can be implemented by computer-readable program instructions.

The computer-readable program instructions capable of executing the system and the method described in the present disclosure are used by one or more processors (and/or one or more cores in the processor) of a general purpose computer, a special purpose computer, or other programmable devices for manufacturing a device. By executing program instructions via a processor of a computer or other programmable devices, a system for implementing functions described in the flowcharts and the block diagrams of the present disclosure is created. These computer-readable program instructions may also be stored in a computer-readable storage medium that can instruct a computer, a programmable device, and/or other devices to function in a specific method. Accordingly, the computer-readable storage medium storing instructions is an article of manufacture including instructions for implementing aspects of the functions specified in the flowcharts and the block diagrams of the present disclosure.

The computer-readable program instructions are loaded onto a computer, other programmable device, or other device, and execute a series of operational steps on the computer, other programmable device, or other device, to generate a processing result of the computer. By the program instructions being executed on the computer, other programmable device, or other device, functions specified in the flowcharts and the block diagrams of the present disclosure is implemented.

FIG. 34 is a functional block diagram of a network system 800 in which one or a plurality of computers, servers, and the like are connected via a network. It should be noted that hardware and software environments shown in an embodiment of FIG. 34 is shown as an example of providing a platform for implementing software and/or a method according to the present disclosure.

As illustrated in FIG. 34, the network system 800 may include, but is not limited to, a computer 805, a network 810, a remote computer 815, a web server 820, a cloud storage server 825, and a computer server 830. In one embodiment, multiple instances of one or more functional blocks illustrated in FIG. 34 are used.

FIG. 34 illustrates a more detailed configuration of the computer 805. Note that the functional blocks illustrated in the computer 805 are illustrated to establish exemplary functions and not all illustrated. Furthermore, although detailed configurations of the remote computer 815, the web server 820, the cloud storage server 825, and the computer server 830 are not illustrated, they may include configurations similar to the functional blocks illustrated for the computer 805.

As the computer 805, it is possible to use a personal computer (PC), a desktop computer, a laptop computer, a tablet computer, a netbook computer, a personal digital assistant (PDA), a smartphone, or any other programmable electronic device capable of communicating with other devices on the network 810.

Then, the computer 805 includes a processor 835, a bus 837, a memory 840, a non-volatile storage 845, a network interface 850, a peripheral interface 855, and a display interface 865. Each of these functions may be implemented as an individual electronic subsystem (an integrated circuit chip or a combination of a chip and an associated device) in one embodiment, and some functions may be combined and implemented as a single chip (system on chip or SoC) in another embodiment.

The processor 835 can be one or more single or multi-chip microprocessors, such as, for example, one designed and/or manufactured by Intel Corporation, Advanced Micro Devices, Inc. (AMD), Arm Holdings (Arm), or Apple Computer. Examples of the microprocessor include Celeron, Pentium, Core i3, Core i5, and Core i7 manufactured by Intel Corporation, Opteron, Phenom, Athlon, Turion, and Ryzen manufactured by AMD, and Cortex-A, Cortex-R, and Cortex-M manufactured by Arm.

The bus 837 can employ a high speed parallel or serial peripheral interconnection bus of a proprietary or industry standard, such as, for example, ISA, PCI, PCI Express (PCI-e), or AGP.

The memory 840 and the non-volatile storage 845 are computer-readable storage media. The memory 840 can employ any suitable volatile storage device, such as a dynamic random access memory (DRAM) or a static RAM (SRAM). For the non-volatile storage 845, it is possible to adopt one or more of a flexible disk, a hard disk, a solid state drive (SSD), a read only memory (ROM), an erasable and programmable read only memory (EPROM), a flash memory, a compact disc (CD or CD-ROM), a digital versatile disc (DVD), a card type memory, or a stick type memory.

Furthermore, a program 848 is also a set of machine readable instructions and/or data. This set is stored in the non-volatile storage 845, and is used to create, manage, and control a specific software function explained in detail in the present disclosure and described in the drawings. Note that, in a configuration in which the memory 840 is much faster than the non-volatile storage 845, the program 848 can be transferred from the non-volatile storage 845 to the memory 840 before being executed by the processor 835.

Via the network interface 850, the computer 805 can communicate with and interact with other computers via the network 810. For the network 810, a configuration can be adopted including wired, wireless, or optical fiber connection by, for example, a local area network (LAN), a wide area network (WAN) such as the Internet, or a combination of LAN and WAN. In general, the network 810 includes any combination of connections and protocols that support communication between two or more computers and associated devices.

The peripheral interface 855 can input and output data to and from other devices that can be locally connected to the computer 805. For example, the peripheral interface 855 provides a connection to an external device 860. As the external device 860, a keyboard, a mouse, a keypad, a touch screen, and/or other suitable input devices are used. The external device 860 may also include a portable computer-readable storage medium, such as, for example, a thumb drive, a portable optical disk or a magnetic disk, or a memory card.

Software and data for implementing an embodiment of the present disclosure, for example, the program 848, may be stored on such a portable computer-readable storage medium. In such an embodiment, software may be loaded onto the non-volatile storage 845, or alternatively may be loaded directly onto the memory 840 via the peripheral interface 855. The peripheral interface 855 may use an industry standard, such as RS-232 or universal serial bus (USB), to connect with the external device 860.

The display interface 865 can connect the computer 805 to a display 870, and there is a mode in which the display 870 is used to present a command line or a graphical user interface to a user of the computer 805. The display interface 865 can use one or more of dedicated connections or industry standards such as a video graphics array (VGA), a digital visual interface (DVI), DisplayPort, and high-definition multimedia interface (HDMI) (registered trademark), to connect to the display 870.

As described above, the network interface 850 provides communication with other computers and storage systems, or devices external to the computer 805. The software program and data described in this specification can be downloaded via the network interface 850 and the network 810, for example, to the non-volatile storage 845 from the remote computer 815, the web server 820, the cloud storage server 825, and the computer server 830. Moreover, the system and the method of the present disclosure can be executed by one or more computers connected to the computer 805 via the network interface 850 and the network 810. For example, in one embodiment, the system and the method of the present disclosure are executed by the remote computer 815, the computer server 830, or a combination of multiple interconnected computers on the network 810.

Data, data sets, and/or databases employed in the embodiment of the system and the method of the present disclosure can be downloaded and stored from the remote computer 815, the web server 820, the cloud storage server 825, and the computer server 830.

Here, in this specification, the processing performed by the computer according to the program needs not necessarily be performed in chronological order with the order described as the flowchart. That is, the processing executed by the computer according to the program includes processing executed in parallel or individually (for example, parallel processing or processing by an object).

Furthermore, the program may be processed by one computer (processor), or may be distributed and processed by a plurality of computers. Moreover, the program may be transferred to a remote computer to be executed.

Moreover, in this specification, a system means a set of a plurality of components (devices, modules (parts), and the like), and it does not matter whether or not all components are in a same housing. Therefore, a plurality of devices housed in separate housings and connected via a network, and a single device with a plurality of modules housed in one housing are both systems.

Furthermore, for example, a configuration described as one device (or processing unit) may be divided and configured as a plurality of devices (or processing units). On the contrary, a configuration described above as a plurality of devices (or processing units) may be collectively configured as one device (or processing unit). Furthermore, as a matter of course, a configuration other than the above may be added to a configuration of each device (or each processing unit). Moreover, as long as a configuration and an operation of the entire system are substantially the same, a part of a configuration of one device (or processing unit) may be included in a configuration of another device (or another processing unit).

Note that the present embodiment is not limited to the above-described embodiment, and various modified examples can be made without departing from the scope of the present disclosure. The effects described in this specification are merely examples and are not limited, and effects other than those described in this specification may be present.

Note that the present disclosure can have the following configurations.

(1)

A network control method including:

by a network connection device, sending, to a data processing device prior to original data, event data indicating a change amount at a predetermined time point of sensor data that is the original data generated by a sensor device, and sending the original data to the data processing device on the basis of a request from the data processing device for the original data.

(2)

The network control method according to (1) above, in which the data processing device executes a process of recovering the original data at the predetermined time point on the basis of the original data acquired by sending a request for the original data to the network connection device and on the basis of the event data acquired previously.

(3)

The network control method according to (1) or (2) above, in which the network connection device executes accumulation processing of accumulating a plurality of pieces of the event data at a predetermined accumulation level, and sends the event data after the accumulation processing to the data processing device prior to the original data.

(4)

The network control method according to any one of (1) to (3) above, in which the data processing device acquires a plurality of pieces of the event data at a predetermined accumulation level, then sends a request for the original data to the network connection device, and acquires the original data.

(5)

The network control method according to (3) or (4) above, in which the predetermined accumulation level is any of: a unit of a predetermined value or more determined in advance; a unit that allows extraction of a region of an object included in the original data; a unit that allows recognition of the object; and a unit that allows tracking of a trajectory of the object.

(6)

The network control method according to any one of (3) to (5) above, in which the predetermined accumulation level is set for every piece of observation data identification information for identifying observation target data to be notified as the event data.

(7)

The network control method according to any one of (1) to (6) above, in which the event data is sent including observation data identification information for identifying observation target data to be notified as the event data.

(8)

The network control method according to (7), in which the observation data identification information is any of: sensor identification information for identifying the sensor device; the sensor identification information, and object identification information for identifying an object on the sensor device basis; global object identification information for globally uniquely identifying the object; or query identification information for identifying a query for the observation target data.

(9)

The network control method according to (8) above, in which the data processing device determines reception of the event data on the basis of the observation data identification information.

(10)

The network control method according to (8) or (9) above, in which the data processing device notifies the network connection device of the observation data identification information, and the network connection device sends, to the data processing device, only the event data including the observation data identification information notified from the data processing device.

(11)

The network control method according to any one of (1) to (10) above, in which the event data includes at least observation data identification information for identifying observation target data to be notified as the event data, a reference address of the original data, and an event type.

(12)

The network control method according to (11) above, in which the event type is either Update including data of the change amount, or Notify that does not include data of the change amount and notifies only of a fact that there has been a change, and the reference address of the original data is a reference address of the original data before a change amount at the predetermined time point is applied in a case where the event type is the Update, and is a reference address of the original data after a change amount at the predetermined time point is applied in a case where the event type is the Notify.

(13)

The network control method according to (12) above, in which in a case where the event type is the Notify, the event data includes a reference address of individualized data obtained by individualizing a plurality of pieces of the event data at a predetermined accumulation level.

(14)

The network control method according to (13) above, in which the individualized data is data of any of: a unit that allows extraction of a region of an object included in the original data; a unit that allows recognition of the object; and a unit that allows tracking of a trajectory of the object.

(15)

The network control method according to any one of (1) to (14) above, in which when sending the event data, the network connection device sends an event path request for requesting reservation of a virtual path between with the data processing device.

(16)

The network control method according to (15) above, in which identification information for identifying priority of the virtual path is stored in the event path request.

(17)

The network control method according to (15) or (16) above, in which a parameter indicating quality of data transfer is stored in the event path request.

(18)

The network control method according to any one of (15) to (17) above, in which an event type, and observation data identification information for identifying observation target data to be notified as the event data are stored in the event path request.

(19)

The network control method according to any one of (1) to (18) above, in which
the network connection device sends a plurality of types of the event data to a plurality of the data processing devices, and selects and executes immediate transfer and delayed transfer of a plurality of types of the event data in accordance with priority of the event data.

(20)

A data processing system including:
a network connection device configured to send, to a data processing device prior to original data, event data indicating a change amount at a predetermined time point of sensor data that is the original data generated by a sensor device, and send the original data to the data processing device on the basis of a request from the data processing device for the original data.

REFERENCE SIGNS LIST

1 Data processing system
11 Sensor
12 Event producer
13 Event path
14 Event consumer
15 Event path manager
16 Topic Manager
17 Topic DB
21 Cloud
111 Sensor
112 Event publisher
113 Event path
114 Broker
115 Event path
116 Event subscriber
117 Event path manager
211 Sensor/edge
221 Cloud
222 Edge cloud
223 Center cloud
800 Network system
805 Computer
810 Network
815 Remote computer
820 Web server
825 Cloud storage server
830 Computer server
835 Processor
840 Memory
845 Non-volatile storage
848 Program
860 External device

The invention claimed is:

1. A network control method comprising:
by a network connection device,
sending, to a data processing device prior to original data, event data indicating a change amount at a predetermined time point of sensor data that is the original data generated by a sensor device, and sending the original data to the data processing device on a basis of a request from the data processing device for the original data, wherein
the event data includes at least observation data identification information for identifying observation target data to be notified as the event data, a reference address of the original data, and an event type,
the event type is either Update including data of the change amount, or Notify that does not include data of the change amount and notifies only of a fact that there has been a change, and
the reference address of the original data is a reference address of the original data before a change amount at the predetermined time point is applied in a case where the event type is the Update, and is a reference address of the original data after a change amount at the predetermined time point is applied in a case where the event type is the Notify.

2. The network control method according to claim 1, wherein
the data processing device
executes a process of recovering the original data at the predetermined time point on a basis of the original data acquired by sending a request for the original data to the network connection device and on a basis of the event data acquired previously.

3. The network control method according to claim 1, wherein
the network connection device
executes accumulation processing of accumulating a plurality of pieces of the event data at a predetermined accumulation level, and sends the event data after the accumulation processing to the data processing device prior to the original data.

4. The network control method according to claim 1, wherein
the data processing device
acquires a plurality of pieces of the event data at a predetermined accumulation level, then sends a request for the original data to the network connection device, and acquires the original data.

5. The network control method according to claim 3, wherein
the predetermined accumulation level is any of: a unit of a predetermined value or more determined in advance; a unit that allows extraction of a region of an object included in the original data; a unit that allows recognition of the object; and a unit that allows tracking of a trajectory of the object.

6. The network control method according to claim 3, wherein
the predetermined accumulation level is set for every piece of observation data identification information for identifying observation target data to be notified as the event data.

7. The network control method according to claim 1, wherein
the event data is sent including observation data identification information for identifying observation target data to be notified as the event data.

8. The network control method according to claim 7, wherein
the observation data identification information is any of: sensor identification information for identifying the sensor device; the sensor identification information, and object identification information for identifying an object on the sensor device basis; global object identification information for globally uniquely identifying the object; or query identification information for identifying a query for the observation target data.

9. The network control method according to claim 8, wherein
the data processing device determines reception of the event data on a basis of the observation data identification information.

10. The network control method according to claim 8, wherein
the data processing device notifies the network connection device of the observation data identification information, and
the network connection device sends, to the data processing device, only the event data including the observation data identification information notified from the data processing device.

11. The network control method according to claim 1, wherein
in a case where the event type is the Notify,
the event data includes a reference address of individualized data obtained by individualizing a plurality of pieces of the event data at a predetermined accumulation level.

12. The network control method according to claim 11, wherein
the individualized data is data of any of: a unit that allows extraction of a region of an object included in the original data; a unit that allows recognition of the object; and a unit that allows tracking of a trajectory of the object.

13. The network control method according to claim 1, wherein
when sending the event data, the network connection device sends an event path request for requesting reservation of a virtual path with the data processing device.

14. The network control method according to claim 13, wherein
identification information for identifying priority of the virtual path is stored in the event path request.

15. The network control method according to claim 13, wherein
a parameter indicating quality of data transfer is stored in the event path request.

16. The network control method according to claim 13, wherein
an event type, and observation data identification information for identifying observation target data to be notified as the event data are stored in the event path request.

17. The network control method according to claim 1, wherein
the network connection device sends a plurality of types of the event data to a plurality of the data processing devices, and selects and executes immediate transfer and delayed transfer of a plurality of types of the event data in accordance with priority of the event data.

18. A data processing system comprising:
a network connection device configured to send, to a data processing device prior to original data, event data indicating a change amount at a predetermined time point of sensor data that is the original data generated by a sensor device, and send the original data to the data processing device on a basis of a request from the data processing device for the original data, wherein
the event data includes at least observation data identification information for identifying observation target data to be notified as the event data, a reference address of the original data, and an event type,
the event type is either Update including data of the change amount, or Notify that does not include data of the change amount and notifies only of a fact that there has been a change, and
the reference address of the original data is a reference address of the original data before a change amount at the predetermined time point is applied in a case where the event type is the Update, and is a reference address of the original data after a change amount at the predetermined time point is applied in a case where the event type is the Notify.

* * * * *